US012280000B2

(12) United States Patent
Miller et al.

(10) Patent No.: US 12,280,000 B2
(45) Date of Patent: Apr. 22, 2025

(54) LIMB HOLDER ALLOWING DISTAL ACTUATION ALONG NON-LINEAR PATHS OF ACTUATION

(71) Applicant: Kyra Medical, Inc, Northborough, MA (US)

(72) Inventors: Howard P. Miller, Concord, MA (US); Thomas K. Skripps, Acton, MA (US)

(73) Assignee: Kyra Medical, Inc, Northborough, MA (US)

( * ) Notice: Subject to any disclaimer, the term of this patent is extended or adjusted under 35 U.S.C. 154(b) by 799 days.

(21) Appl. No.: 17/326,108

(22) Filed: May 20, 2021

(65) Prior Publication Data

US 2021/0267828 A1 Sep. 2, 2021

Related U.S. Application Data

(63) Continuation of application No. 15/706,231, filed on Sep. 15, 2017, now Pat. No. 11,013,652.

(60) Provisional application No. 62/495,665, filed on Sep. 19, 2016, provisional application No. 62/600,260, filed on Feb. 17, 2017, provisional application No. 62/601,545, filed on Mar. 27, 2017.

(51) Int. Cl.
*A61G 7/075* (2006.01)

(52) U.S. Cl.
CPC .................................. *A61G 7/0755* (2013.01)

(58) Field of Classification Search
CPC ...... A61B 6/04; A61G 13/00; A61G 2200/56; A61G 13/1245; A61G 13/123; A61G 7/0755; A61G 13/101; A61G 13/12; A61G 13/125; A47C 20/021
See application file for complete search history.

(56) References Cited

U.S. PATENT DOCUMENTS

| | | | | |
|---|---|---|---|---|
| 4,018,412 | A | 4/1977 | Kees et al. | |
| 4,443,005 | A * | 4/1984 | Sugarman | A61G 13/12 5/651 |
| 4,796,846 | A | 1/1989 | Meier et al. | |
| 4,886,258 | A | 12/1989 | Scott | |
| 5,802,641 | A | 9/1998 | Steenburg | |
| 5,961,085 | A * | 10/1999 | Navarro | A47C 16/00 5/624 |

(Continued)

FOREIGN PATENT DOCUMENTS

| | | | |
|---|---|---|---|
| EP | 1014911 | A1 | 7/2000 |
| WO | 9844890 | A1 | 10/1998 |

*Primary Examiner* — Ophelia A Hawthorne
(74) *Attorney, Agent, or Firm* — Potomac Law Group, PLLC; John J. Penny, Jr.

(57) ABSTRACT

An apparatus for supporting and positioning a patient's leg during a surgical procedure includes a substantially rigid, non-linear support structure comprising a distal segment and a proximal segment. The apparatus further includes a proximal locking swivel joint and an actuation handle. The proximal locking swivel joint is coupled to the proximal segment of the support structure and holds the support structure in a plurality of positions. The actuation handle is connected to the distal segment of the support structure and coupled to the proximal locking swivel joint. Activation of the actuation handle results in release of the proximal locking swivel joint, thereby allowing repositioning of the support structure into a plurality of positions.

10 Claims, 27 Drawing Sheets

(56) References Cited

U.S. PATENT DOCUMENTS

| | | | |
|---|---|---|---|
| 6,058,534 | A | 5/2000 | Navarro et al. |
| 6,263,531 | B1 | 7/2001 | Navarro et al. |
| 6,564,406 | B2 | 5/2003 | VanSteenburg et al. |
| 6,704,959 | B2 | 3/2004 | Schuerch |
| 7,520,007 | B2 | 4/2009 | Skripps |
| RE41,412 | E | 7/2010 | Steenburg |
| 8,322,342 | B2 | 12/2012 | Soto et al. |
| 8,448,274 | B2 | 5/2013 | Broens |
| 8,833,707 | B2 | 9/2014 | Steinberg et al. |
| 9,022,334 | B1 | 5/2015 | Demayo |
| 9,107,784 | B2 | 8/2015 | Doyle |
| 9,469,438 | B2 | 10/2016 | Nool et al. |
| 9,554,959 | B2 | 1/2017 | Carn et al. |
| 9,615,987 | B2 | 4/2017 | Worm et al. |
| 9,951,904 | B2 | 4/2018 | Perez et al. |
| 9,993,381 | B2 | 6/2018 | Blackwell et al. |
| 10,188,573 | B2 | 1/2019 | Moriarty et al. |
| 10,292,883 | B2 | 5/2019 | Jepsen et al. |
| 10,357,416 | B2 | 7/2019 | Cole et al. |
| 10,478,363 | B2 | 11/2019 | Koch et al. |
| 10,478,364 | B2 | 11/2019 | Fossez et al. |
| 10,531,974 | B2 | 1/2020 | Hunter, Jr. et al. |
| 10,617,586 | B2 | 4/2020 | Katzenstein et al. |
| 2006/0225743 | A1 | 10/2006 | Schuerch |
| 2012/0318278 | A1 | 12/2012 | Aboujaoude et al. |
| 2016/0120726 | A1 | 5/2016 | Moriarty et al. |
| 2016/0296401 | A1 | 10/2016 | Cole et al. |
| 2016/0324701 | A1 | 11/2016 | Cambridge et al. |
| 2017/0143572 | A1 | 5/2017 | Bergman et al. |
| 2017/0165143 | A1 | 6/2017 | Schuerch, Jr. |
| 2017/0224569 | A1 | 8/2017 | Pfeuffer et al. |
| 2017/0281447 | A1 | 10/2017 | Ane et al. |
| 2017/0326015 | A1 | 11/2017 | Katzenstein et al. |
| 2018/0028387 | A1 | 2/2018 | Yellin et al. |
| 2018/0073528 | A1 | 3/2018 | Pryor et al. |
| 2019/0216665 | A1 | 7/2019 | Miller et al. |
| 2019/0254905 | A1 | 8/2019 | Lane, II et al. |

* cited by examiner

LIMB HOLDER ALLOWING DISTAL ACTUATION ALONG NON-LINEAR PATHS OF ACTUATION

CROSS-REFERENCE TO RELATED APPLICATIONS

This Application is a Division of application Ser. No. 15/706,231 filed on Sep. 15, 2017, which claims the benefit of U.S. Provisional Application Ser. No. 62/495,665 filed Sep. 19, 2016, 62/600,260 filed Feb. 17, 2017, and 62/601,545 filed Mar. 27, 2017, all of which are incorporated herein by reference in their entirety.

TECHNICAL FIELD

The present disclosure relates generally to a limb holder apparatus for medical applications that uses a non-linear substantially rigid support structure, which allows for distal actuation along non-linear actuation paths with a boot mount apparatus coupling a support boot to said support structure.

BACKGROUND

Medical and surgical procedures often times require that the patient's body and/or extremities be positioned to facilitate access to the surgical site(s). Often, the procedure(s) being performed may require that the limb be repositioned during the procedure (i.e., intra-operatively). Typically, in surgery, a patient is given a general anesthetic prior to a procedure, which may prevent the body's natural defense mechanisms (e.g., pain responses or involuntary movements) from protecting the body from long periods of high pressure or movement of the limb(s) outside their normal range of motion. Excess pressure on a limb, or movement of the limb, during surgical procedures pose a well-documented risk of severe patient injury, which may include nerve and/or muscle damage as well as joint dislocation or post-surgical discomfort.

Because the surgical staff is wearing sterile gloves and gowns to maintain the sterile surgical site, it is imperative that they be able to adjust the non-sterile equipment without breaking the sterile field. Limb holders, such as lithotomy stirrups, have support structures fixed to a proximal swivel joint which, in turn, is attached to a surgical table accessory rail. These stirrups are typically used to position legs, for example, during gynecological and urological procedures.

Limb holders introduced in the late 1990's enabled distal actuation of the motion of the supporting structure relative to the proximal locking swivel joint. This feature allowed clinicians to adjust the patient's limb position through a sterile drape and at a distance from the surgical site, which is typically the groin or abdomen. Sterile drapes, in this case, are often made of a clear material, allowing the staff to see the distal handle and actuate it manually, while maintaining proper protocols to maintain the sterile field. In addition, limb holders typically have a gas piston which, in certain positions, provides an upward force that reduces the force required to support the leg while the clinician is moving the limb during or before surgery.

Current limb holders/extremity holders allow distal actuation of simultaneous axes of motion (including abduction/adduction and high low lithotomy positioning) of the supporting structure and supported limbs during medical and surgical procedures, intra-operatively. Conventional devices accomplish this distal actuation through the use of a single, rigid actuation rod located within a hollow support structure.

This actuation rod and support structure follows a linear path longitudinal to the patient's body and the surgical table, translating the rotational motion of the distal actuation handle along a straight and singular, linear path to a clamp release mechanism. The support structure is fixed to a proximal locking swivel joint, and is allowed to move along various axes, relative to the mounting mechanism fixed to the table, when the clamping force is released. Then, it is again held in place when the clamping force is reapplied as the actuation rotational force at the handle is removed.

In the conventional limb holder arrangement discussed above, the rotation of the actuation handle, the rotation of the actuation rod, and the rotation of the proximal locking swivel joint release mechanism and the structure of the supporting member all share the same linear axis. Note that the proximal locking swivel joint mechanism and mechanisms for releasing a clamping force of this proximal locking swivel joint are generally understood in the art; therefore this will not be explained in this application. For purposes of this application, the term "proximal locking swivel joint" will be used to refer to a typical mechanism for accomplishing this action, such as a band clamp or similar friction based mechanism.

During surgery, the patient's foot is held either in a booted lithotomy stirrup or a hip distractor. In the case of a booted lithotomy stirrup, the patient's legs are held in a padded boot and positioned hold the legs out of the surgical field and provide access to the surgical site (anus, vagina, lower abdomen). These stirrups are intended to protect the lower leg from injury during a surgical procedure. The boot is generally mounted medially to the support structure. In the case of a hip distractor, the patient's foot is held in a boot or strap system in order to efficiently pull the leg along the longitudinal axis of a spar, resulting in the partial separation of the hip joint for access to the joint by arthroscopic surgical instruments. Hip distractors generally hold the foot above (anterior to) the spar. The legs are not generally bent at the knee and any additional range of motion of the boot mount is intended to align the pulling force through axis determined by the patient's ankle, knee and hip joints.

Conventional limb holders have a number of flaws that make them suboptimal in many model surgical scenarios. For example, the use of a linear (i.e., straight) support structure requires that when the patient's leg is moved to adjust its position, the axis of translation of the boot or limb cradle passes below the hip joint rather than through the hip joint. This translation offset has the potential to create stress at the patient's femoral acetabular junction and trochanter, and in the case of lithotomy positioning, could lead to patient injury, possibly in the form of hip dislocation or discomfort. Additionally, many modern robotic surgery techniques employ multiple tool arms and tools that are used in surgical procedures requiring limb positioning, and may be located laterally and/or medially relative to the patient's limb or limbs. The conventional limb holders require that the support structure, through which the actuation mechanism is placed, be located lateral to the patient's leg (and along the patient's longitudinal axis), potentially obstructing some modern robotic surgical arms and instruments, such as those used in urological or gynecological procedures.

Moreover, some surgical procedures require that the surgical table be angled so that the patient's head is elevated up to 45 degrees above the feet (i.e., a "reverse Trendelenburg position") while other procedures require the feet to be elevated up to 45 degrees above the head (i.e., the "Trendelenburg position"). Some procedures may require that the patient be moved from one of these positions to another. The surgical table must be so angled thus requiring a wide range of motion of lithotomy stirrups, and the legs they support, relative to the surgical table. This can require the stirrups supporting the legs to have a range of motion of up to 140°. This extreme range of motion was not contemplated when distally actuated stirrups were originally introduced. In fact, conventional systems limit the range of motion to about 118°

In the case of extreme Trendelenburg positioning, whereby the table may be positioned at up to a 45 degree incline relative to the floor, the patient's body may move. This movement may cause the patient's foot to slide out of the support boot, thereby creating a risk of injury due to hyperextension of the leg. In this case, the clinician must reposition the boot to reestablish proper leg positioning. The boot mount apparatus of conventional stirrups, when unlocked, releases the boot stirrup to move along multiple axes relative to the support structure, when only motion along the longitudinal axis of the support structure is desired. This requires unlocking of all ranges of motion which, in turn, results in a single clinician having to bear a significant portion of the weight of the patient's leg creating an unsafe and unstable situation for both clinician and patient.

SUMMARY

Embodiments of the present invention address and overcome one or more of the above shortcomings and drawbacks, by providing methods, systems, and apparatuses for supporting and positioning a patient's leg during a surgical procedure.

According to some embodiments, an apparatus for supporting and positioning a patient's leg during a surgical procedure includes a substantially rigid, non-linear support structure comprising a distal segment and a proximal segment. The apparatus further includes a proximal locking swivel joint and an actuation handle. The proximal locking swivel joint is coupled to the proximal segment of the support structure and allows holding of the support structure in a plurality of positions. The actuation handle is connected the distal segment of the support structure and coupled to the proximal locking swivel joint. Activation of the actuation handle results in release of the proximal locking swivel joint, thereby allowing repositioning of the support structure into a plurality of positions. In one embodiment, the proximal locking swivel joint comprises a blade and the apparatus further comprises a table rail clamp configured to attach the proximal locking swivel joint to a surgical table using the blade.

The actuation handle used in the aforementioned apparatus may be mounted in various configurations. For example, in some embodiments, the actuation handle is mounted on an axis aligned with the distal segment of the support structure. In other embodiments, the actuation handle is mounted off an axis aligned with the distal segment of the support structure. In still other embodiments, the actuation handle is mounted on an axis having an angle of 90 degrees or less with respect to the distal segment of the support structure.

Various types of actuation mechanisms may be used with the apparatus discussed above. For example, assume that internal channel extends along the length of the support structure. In one embodiment, a proximal locking swivel comprising a pivot member and a rotatable member operable to release the proximal locking swivel joint. A cable connects the actuation handle and the rotatable member through the internal channel. Squeezing of the actuation handle results in pulling of the cable that travels around a pivot point to transfer a pull force to engage rotation action to release the proximal locking swivel joint. In one embodiment, the apparatus includes one or more rotatable members operable to release the proximal locking swivel joint. One or more flexible torsion drives are coupled to one or more actuation rods and the one or more rotatable members. In one embodiment, rather than using flexible torsion drives, universal joints are coupled to the actuation rods at a distal end of the actuation rods and the rotatable members at a proximal end of the actuation rods. Rotation of the actuation handle results in rotation of the one or more rotatable members (via the flexible torsion drives or the universal joint) which, in turn, results in release of the proximal locking swivel joint.

In some embodiments, the aforementioned apparatus further includes a flexible support boot connected to the distal segment of the support structure via a moveable boot mount that allows movement of the flexible support boot in one or more dimensions relative to the support structure. This flexible support boot may include, for example, a substantially rigid ambidextrous foot section and a flexible upper element comprising a left calf section or a right calf section coupled to the foot section. The support boot may further include a top flap element; and flexible and non-porous straps for securing the top flap element over the other elements of the boot during the surgical procedure.

According to another aspect of the present invention, as described in some embodiments, an apparatus for supporting and positioning a patient's leg during a surgical procedure includes a substantially rigid support structure, a proximal locking swivel joint, a gas piston mounting element, and a gas piston assembly. The proximal locking swivel joint is coupled to a proximal end of the support structure and holds the support structure in at least one position relative to a surgical table. The gas piston mounting element is connected to a mount plate common to the proximal locking swivel joint. The gas piston assembly is connected to the gas piston mounting element at a first piston end point and connected to the proximal end of the support structure at a second piston end point. At least one of the first piston end point and the second piston end point is movable during operation as a spring in the gas piston assembly is being compressed and extended through the range of motion of the support structure to which it is attached.

According to other embodiments of the present invention, a mechanism for supporting a patient's leg during a surgical procedure includes substantially rigid support structure, a proximal locking swivel joint, and an actuation handle. The substantially rigid support structure extends from a proximal end to a distal end with respect to the patient. The proximal end is offset from an axis aligned with the distal end by an angle of greater than 0 and less than 90 degrees. The proximal locking swivel joint is coupled to the proximal end of the support structure and holds the support structure in one of a plurality of positions relative to a surgical table. The actuation handle is coupled to the distal end of the substantially rigid support structure and connected to the proximal locking swivel joint through the substantially rigid support structure over a non-linear path. Rotation of the actuation handle acting about the axis generally aligned with the proximal end results in release of the proximal locking swivel joint thereby allowing repositioning of the support structure relative to the surgical table.

In other embodiments of the present invention, an apparatus for supporting and positioning a patient's leg during a surgical procedure includes a proximal locking swivel joint, a non-linear actuation path, a substantially rigid housing, and an actuation handle. The proximal locking swivel joint is configured to allow positioning the housing in a plurality of positions. For example, in one embodiment, the proximal locking swivel joint is configured to allow movement of the substantially rigid housing with an angular range of motion of at least 90 degrees in at least one plane. In other embodiments, the proximal locking swivel joint is configured to allow movement of the housing in two orthogonal planes. The non-linear actuation path extends from a distal actuation end to the proximal locking swivel joint. At least a portion of the non-linear actuation path is disposed in the substantially rigid housing. In one embodiment, the substantially rigid housing has a non-linear shape. The actuation handle included in the apparatus is coupled to the distal actuation end to effect release of the proximal locking swivel joint via the non-linear actuation path, thereby allowing repositioning of the housing.

According to another aspect of the present invention, as described in some embodiments, an apparatus for supporting and positioning a patient's leg during a surgical procedure includes a support device assembly, a piston mounting element, and a gas piston. The support device assembly comprises one or more support structures for supporting the patient's leg during the surgical procedure. The piston mounting element is connected to a point proximal to the support device assembly. This element comprises a first piston end point and a second piston end point. The gas piston is connected to the piston mounting element at the first piston end point and connected to a distal end of the support structure at the second piston end point. At least one of the first piston end point and the second piston end point is moveable during operation of the gas piston. In one embodiment, the apparatus further includes a bracket providing connection of the second piston end point to the distal end of the support device assembly. This bracket allows translational movement of the second piston end point along an axis aligned with the distal end of the support structure when the gas piston is in a fully-extended position.

In other embodiments of the present invention, an apparatus for supporting and positioning a patient's leg during a surgical procedure includes a support structure, a support boot, a boot mount assembly, and an actuation mechanism. The support structure has a distal support axis and a proximal support axis with respect to a patient. The support boot is operable to hold and support a patient's leg. The boot mount assembly couples the support boot to the support structure. This support boot can be (i) moved generally parallel to the distal support axis of the support structure while resisting rotational motion about the distal support axis, (ii) rotated about a medial/lateral axis, and (iii) rotated about a boot float axis. The various axes may be defined with respect to the other components of the system. For example, in one embodiment, the distal support axis and the proximal support axis are co-linear or parallel and, the medial/lateral axis passes through a boot mount surface included on the boot mount assembly.

The actuation mechanism included on the aforementioned apparatus allows for independently and selectively enabling and disabling motion in a linear direction along an axis generally parallel to the distal support axis of the support structure. This actuation mechanism may include, for example, a rotating cam, an inclined plane and follower, or a cable-based actuation system. In some embodiments, actuation of the actuation mechanism is performed by turning of a threaded knob or handle. When not actuated, the actuation mechanism may return to a locked position. In some embodiments, the apparatus includes an additional actuation mechanism providing actuation to lock and unlock the support boot in multiple discrete positions about the medial/lateral axis. Additionally, in some embodiments, the apparatus includes a friction mechanism operable to resist rotation of the support boot about the medial/lateral axis. This friction mechanism may include a means for adjusting friction force, or the mechanism may be non-adjustable.

In other embodiments, an apparatus for supporting and positioning a patient's leg during a surgical procedure includes a substantially rigid support structure, a proximal locking swivel joint, and a support boot. The substantially rigid support structure supports the patient's leg. The structure has a distal support axis and a proximal support axis with respect to a patient. The proximal locking swivel joint is coupled to a proximal end of the support structure and holds the support structure in at least one position relative to a surgical table. The support boot is mounted via a transverse mount rod that is attached to a distal end of the support structure via a moveable boot mount assembly. This assembly allows the release of the support boot in one or more ranges of motion independently and selectively. In some embodiments, the apparatus includes a second support boot actuator operable to, when engaged, allows for independent and selective adjustment of the support boot about a medial/lateral axis. Alternatively, this second support boot actuator may allow independent and selective adjustment of the support boot linearly and generally along an axis aligned with the distal support axis while (i) resisting rotational motion about the distal support axis and (ii) allowing rotation about a boot float axis.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to supporting and positioning a patient's leg during surgical procedures requiring lithotomy positioning of the legs (moving the patients legs away from the surgical site). Briefly, the technology described herein includes a substantially rigid non-linear support structure, a proximal locking swivel joint, a moveable boot mount apparatus, and a distal actuation handle. The locking swivel joint is located at a position proximal to the surgical table and it allows holding the support structure in a plurality of positions during surgical procedures. The actuation handle (e.g., rotatable handle, trigger, squeeze action mechanism, etc.) is located at a distal end of the support structure with respect to surgical table. Handle engagement causes actuation of a proximal locking swivel joint along one or more non-linear paths through a non-linear support structure.

Figure 1A:
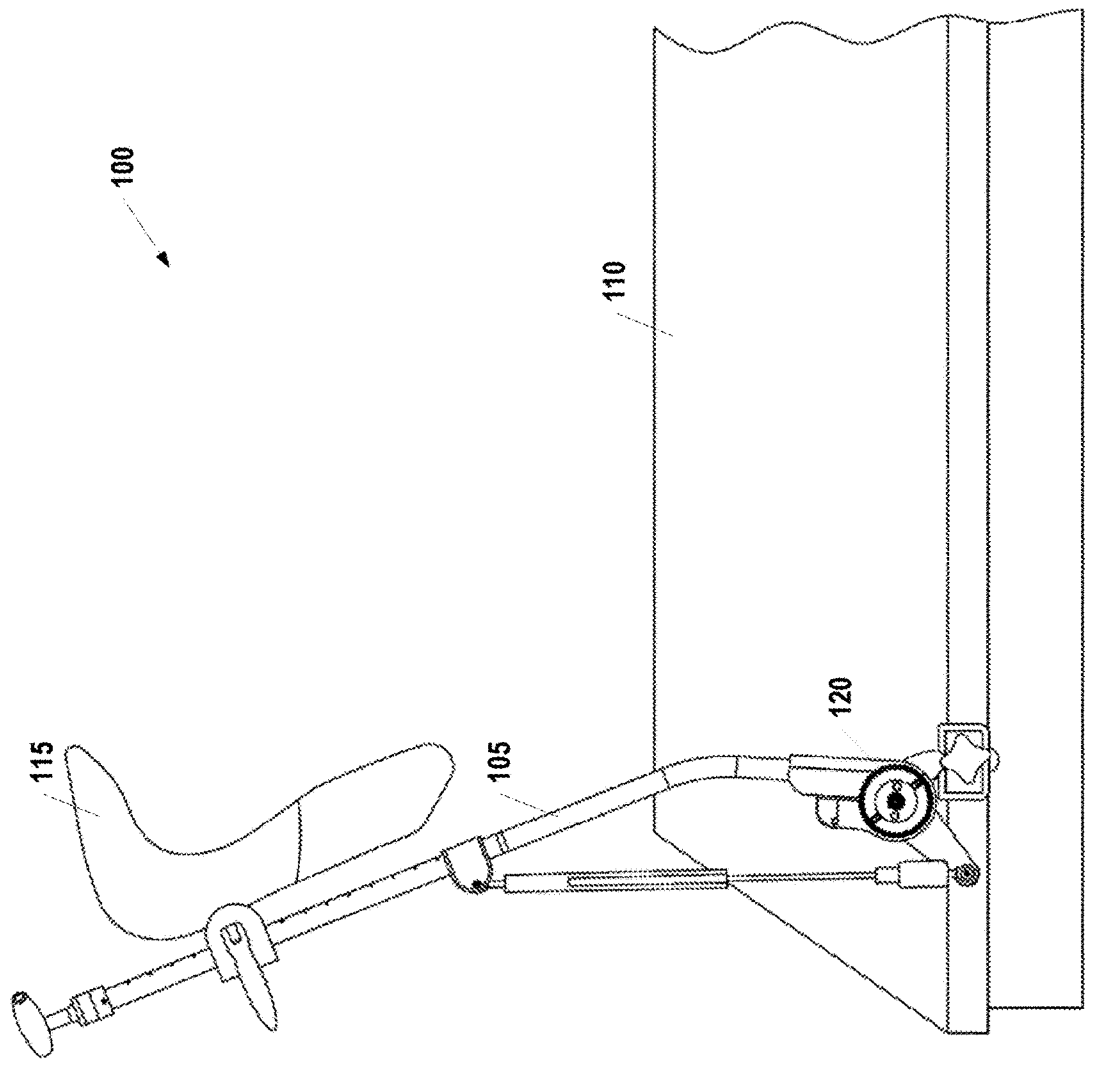
FIG. 1A provides an overview of a lithotomy positioning system, according to some embodiments.

FIG. 1A provides an overview of a lithotomy positioning system 100, according to some embodiments. Briefly, the system 100 includes a limb holder support structure 105 connected to a surgical table 110 via an accessory rail (not shown in FIG. 1A). During surgery or other clinical procedures, the patient's leg is secured in support boot 115 and the limb holder support structure 105 holds the leg at a desired position. It should be noted that, although a single limb holder support structure 105 is shown in FIG. 1A for simplicity, under typical scenarios two limb holder apparatuses would be employed to support the patient's left and right leg, respectively.

As described in further detail below, the limb holder support structure 105 allows for distal actuation of the support structure 105 along one or more non-linear paths through a nonlinear support structure. This non-linear support structure with non-linear actuation allows the axis of translational motion of the limb holder support structure 105 to align closer with the patient's hip, rather than through the axis of the proximal locking swivel joint 120. In turn, this can reduce stress at the hip and, thus, reduce the risk of patient injury, including potential hip dislocation. Additionally, the use of a non-linear support structure with paths of non-linear actuation allows placement of the support structure of the limb holder support structure 105 to positions posterior to (under) the patient's limb. Such placement can reduce interference with modern robotic instrumentation arms, surgical instruments, or other devices used in surgical procedures.

Figure 1B:
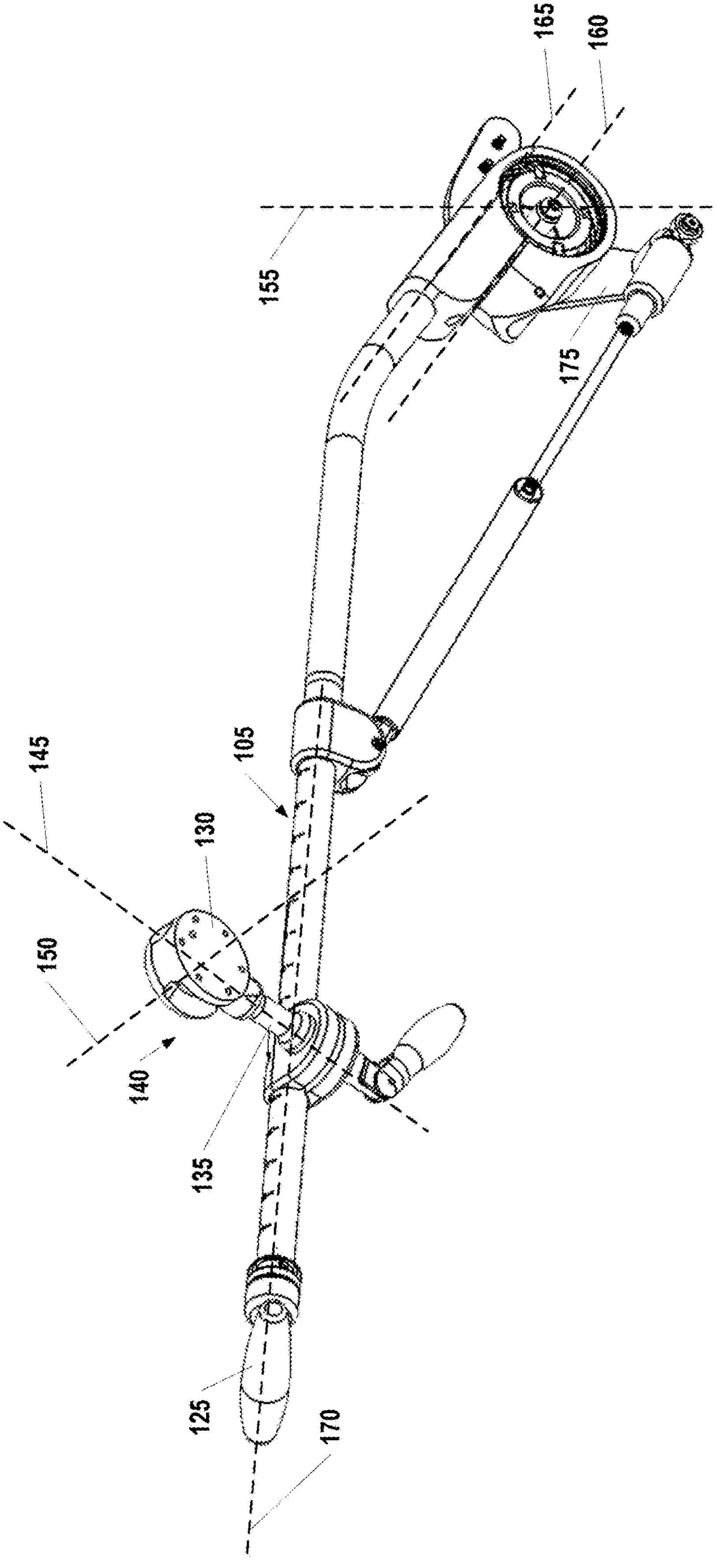
FIG. 1B provides an overview of the apparatus and relevant axes used in describing this invention.

FIG. 1B illustrates an alternate view of lithotomy positioning system 100, according to some embodiments, and the various axes of motion of this apparatus. Note that in this example the support boot 115 is not shown to allow viewing of other components of the system 100. The distal actuation handle 125 is generally aligned with a distal support axis 170. In the context of the present application, the term "generally aligned" means that rotation of the handle causes rotation about the axis without the necessity of the handle being mounted on the axis. The distal actuation handle 125 in this example is actuated by rotation or pulling; however it should be understood that other types of actuation handle may be used such as those actuated via a trigger or squeezing mechanism. A boot float axis 145 is generally perpendicular to the distal support axis 170.

A boot mount support apparatus 140 comprises a boot mount surface 130 and a boot mount apparatus offset post 135. The boot mount support apparatus 140 is able to move along the non-linear support structure 105 and the distal support axis 170. The boot float axis 145 is generally parallel to the boot mount apparatus offset post 135. In the context of the present application, the term "generally parallel" means parallel within deviation of up to 20 degrees. The boot mount surface 130 of the boot mount support apparatus 140 allows mounting of the stirrup support boot (see FIG. 1A). The medial/lateral axis 150 is generally perpendicular to the boot float axis 145 and passes generally perpendicular through the boot mount surface 130.

A mount plate 175 is used to mount the system 100 to the surgical table. A lithotomy axis 160 is generally perpendicular to the mount plate 175 and generally parallel to the table mount surface 110 (see FIG. 1A). An abduction/adduction axis 155 passes generally through the rotational center of the proximal locking swivel joint 120 and is generally perpendicular to the lithotomy axis 160 and the proximal support axis 165. The proximal support axis 165 is generally shared with the longitudinal axis of the most proximal section of the support structure. The medial plane is the ideal center of the patient dividing the patient into left and right halves. The lithotomy positioning system 100 rotates about the lithotomy axis 160 when positioning a patient's legs upwards or downwards relative to the table mount surface 110 (see FIG. 1A). The stirrup rotates about the abduction/adduction axis 155 when moving toward or away from the medial plane.

Figure 2A:
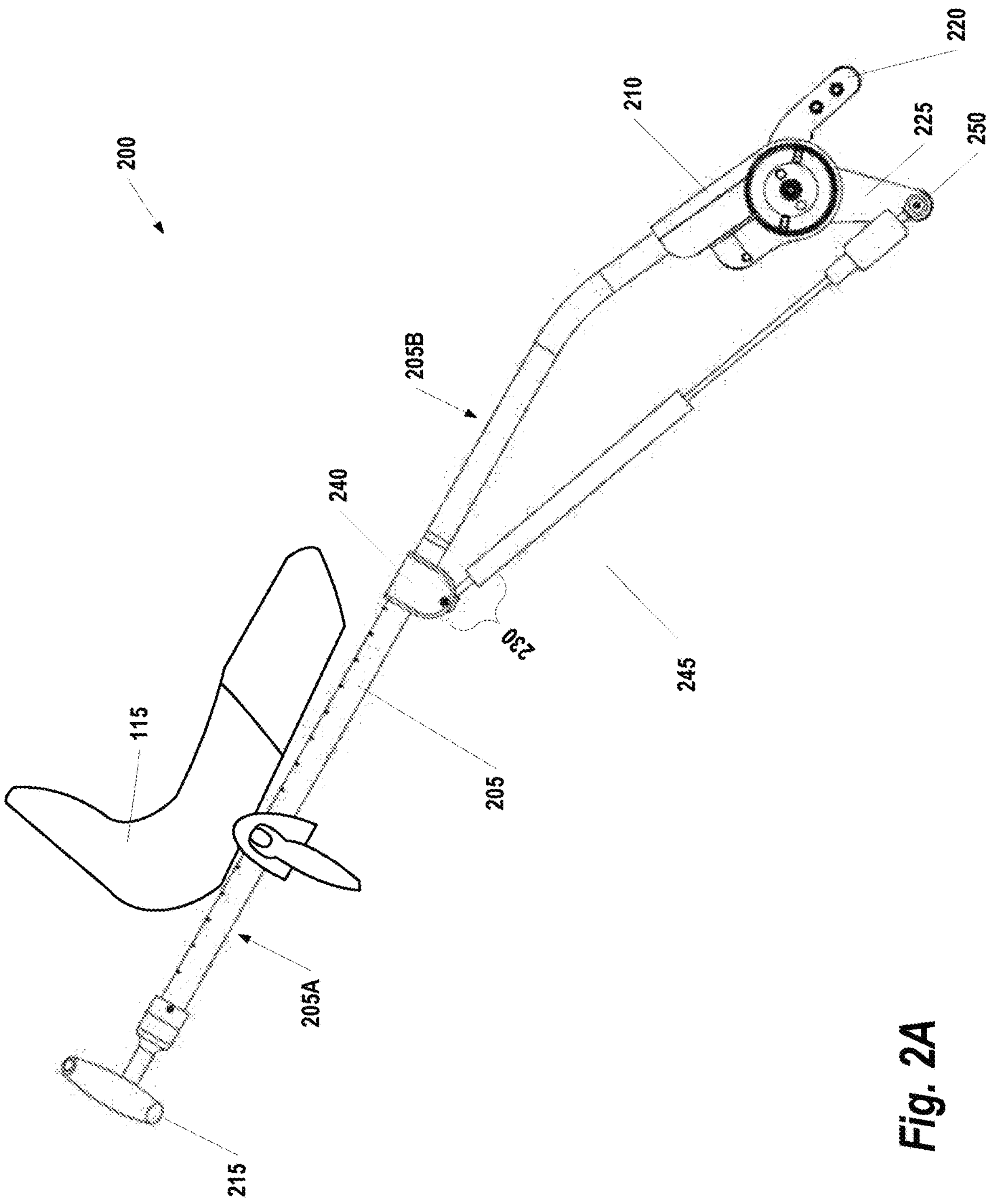
FIG. 2A illustrates an apparatus for supporting and positioning a patient's leg during a surgical procedure, according to some embodiments.
Figure 2B:
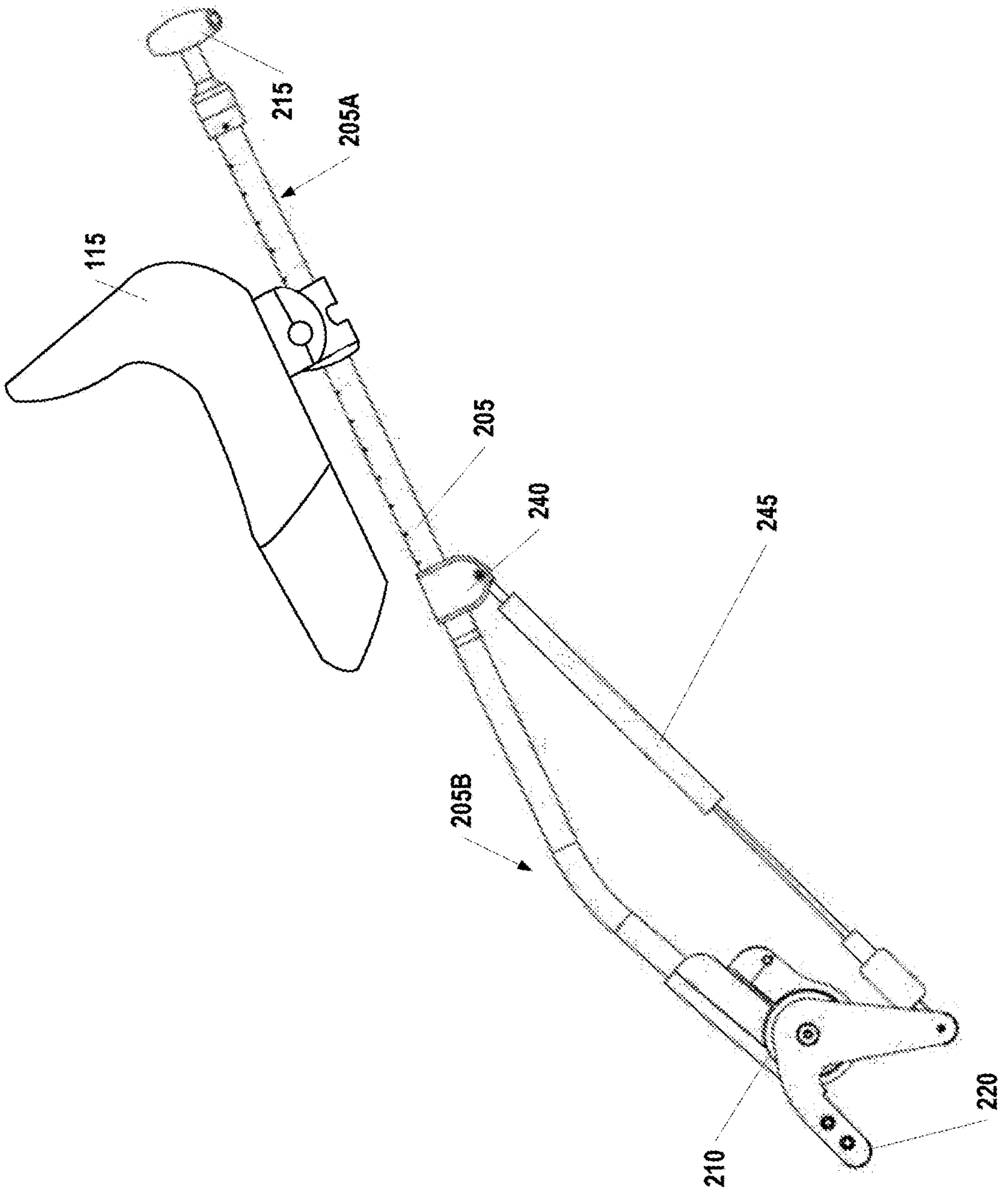
FIG. 2B shows a rear view of the limb holder apparatus shown in FIG. 2A.

FIG. 2A illustrates an apparatus 200 for supporting and positioning a patient's leg during a surgical procedure requiring lithotomy leg positioning, according to some embodiments. FIG. 2B shows the example apparatus 200 from FIG. 2A in a reverse view. Briefly, the apparatus 200 comprises a non-linear support structure 205, a proximal locking swivel joint 210, and a distal actuation handle 215. The non-linear support structure 205 is substantially rigid in its construction to allow for support of the patient's leg during the surgical procedure. The tolerances for the non-linear support structure 205 may be defined based on, for example, maximum weight expectancy for human legs. For example, if studies indicate that human legs weigh, on average, 50 pounds and may weigh as much as 100 pounds, a "substantially rigid" support structure would be one that does not bend in any appreciable amount (that is, any amount that would adversely interfere with the its function) when 100 pounds of force are applied to it and whose shape is not transformable through mechanical means. As used herein, the term "substantially rigid," is intended to mean a structure (e.g., support structure 205) whose shape is not mechanically transformable, and that does not plastically or permanently deform from its original shape when subjected to a clinically relevant load (e.g., a load not greater than 100 pounds at the distal end of the support structure). Elastic deformation is allowed, under a clinically relevant load (defined as no greater than 100 lbs. at the end of the support structure).

For example, materials such as steel alloys, aluminum, rigid plastics, carbon fiber, or other materials commonly used in load bearing structures, would deform by bending under load but not unacceptably. In some embodiments, a clinically acceptable deformation range for a leg support structure would be equal to or less than 6 inches over a 36 inch long structure; that is having a deformation to length ratio of equal to or less than 17% when under a clinically relevant load (e.g., a load no greater than 100 lbs. at the distal end of the support structure).

For the purposes of the description provided herein, the segment 205B of the non-linear support structure 205 which is proximal to the surgical table is referred to as the "proximal segment," while the segment 205A distal to the surgical table is referred to as the "distal segment". In the example of FIGS. 2A and 2B, the division between the proximal segment 205B and the distal segment 205A may be understood as being at the distal mounting element 240 (described in further detail below). However, the distinction between the two segments is meant for explanatory purposes only; thus, any sub-section of the support structure 205 proximal to the table may be understood as the proximal segment 205B, while the remaining sub-section is the distal segment 205A.

A proximal locking swivel joint 210 is coupled to the proximal segment 205B of the non-linear support structure. This proximal locking swivel joint 210 can be used to hold the nonlinear support structure 205 in a plurality of positions. Various clamping mechanisms generally known in the art may be used as the proximal locking swivel joint 210. For example, in some embodiments, the proximal locking swivel joint 210 is a band clamp actuated by a rotating cam. In the example of FIGS. 2A and 2B, the proximal locking swivel joint includes a mounting blade 220 that may be inserted into a surgical table clamp (see FIGS. 3A and 3B) to attach the proximal locking swivel joint 210 to the accessory rail of a surgical table.

The proximal locking swivel joint 210 is configured to allow an angular range of motion of at least 90 degrees for the support structure about the lithotomy axis 160 (FIG. 1B) and at least 20 degrees about abduction/adduction axis 155 (FIG. 1B). For example, in one embodiment, the proximal locking swivel joint 210 allows movement of the non-linear support structure 205 from a position parallel to the surgical table (0 degrees) to a position greater than 45 degrees relative to the table mount surface. This latter position is sometimes referred to as a "high lithotomy position." It should be noted that the angular range of motion is not necessarily limited to 45 degrees but could be greater than this angle. For example, in some embodiments, the proximal locking swivel joint 210 allows movement of the non-linear support structure to positions below the surgical table mount surface (e.g., −55 degrees). Additionally, the proximal locking swivel joint 210 is not necessarily limited to one axis of movement. For example, in some embodiments, the proximal locking swivel joint 210 allows movement of the non-linear support structure 205 about two axes. In some embodiments, the proximal locking swivel joint 210 can allow motion of the non-linear support structure 205 about two axes, with the second range of motion (in addition to the other described in this paragraph) being in the clinically safe range of up to 9 degrees of adduction and up to 22 degrees of abduction.

An actuation handle 215 is connected the distal segment 205A of the non-linear support structure 205. This actuation handle 215 is coupled to the proximal locking swivel joint 210 through an internal channel in the non-linear support structure 205. Rotation of the actuation handle about an axis aligned with the distal segment of the non-linear support structure results in release of the proximal locking swivel joint, thereby allowing repositioning of the non-linear support structure 205 into a plurality of positions. It should be noted that this is only one example of an actuation handle and, in other embodiments, other actuation mechanisms can be used to provide release of the proximal locking swivel joint. For example, in some embodiments, an actuation mechanism may be used that is pulled or squeezed rather than rotated to provide actuation.

As depicted in FIG. 2A, the support structure 205 has a non-linear shape (that is, the proximal and distal ends of the support structure are not disposed along a linear path relative to one another). The use of a curved non-linear support structure 205 eliminates dangerous pinch hazards that may be present in a conventional limb holder apparatus. For apparatuses such as the limb holder apparatus discussed herein, a pinch hazard is any point at which it is possible for part of a person's body to be caught between moving parts of the apparatus. One pinch hazard on conventional stirrups with gas pistons may occur when the stirrup is moved to the low lithotomy position. In this case, the support structure comes in close proximity to the proximal attachment 725 (FIG. 8), creating a pinch hazard if a hand or finger is inadvertently placed in this gap. Another pinch hazard may occur when conventional stirrups are moved to the high lithotomy position whereby the gas piston 245 can come closer than ⅛" of the proximal locking swivel joint 210. This pinch hazard is especially dangerous if the stirrup is accidentally actuated after removal from the table. The FDA reports severe and permanent crushing hand injuries from such a pinch hazard. Both the gas piston mount (see FIG. 7) assembly, described in detail below, and the substantially rigid non-linear support structure with non-linear paths of actuation work to eliminate such pinch hazards.

The substantially rigid non-linear support structure 205 is designed to provide a nonlinear actuation path extending from the distal actuation handle 215 to the proximal locking swivel joint 210. In the example shown in FIGS. 2A and 2 B, the housing of the non-linear support structure 205 is curved. For example, the components disposed within the non-linear support structure, that transmit an actuation force from the distal handle to a proximal swivel joint release mechanism, can be positioned along a non-linear path through the non-linear support structure. By way of example, in some embodiments, such a non-linear path can be composed of two or more linear segments that are disposed at a particular angle (e.g., an acute angle in a range of about 5 to about 90 degrees, relative to one another). In other implementations, the non-linear actuation path through the support structure 205 can be in the form of a continuously curved path. For example, in some embodiments, a substantially rigid, non-linear housing is employed. Within this housing, one or more mechanisms (e.g., cables, flexible torsion drives, or universal joints) connect the distal actuation handle 215 and the proximal locking swivel joint 210 over a non-linear path. It should also be noted that the entire non-linear actuation path does not need to be included in a single non-linear support structure. For example, in some embodiments, a substantially rigid housing may be used to contain a portion of the non-linear actuation path, while other portions of the path are in other housings that include the housing of the proximal locking swivel joint 210.

The system depicted in FIG. 2A further includes a gas piston system to provide additional reinforcement to the support structure 205 while in use. This piston system comprises a gas piston 245, a distal mounting element 240 and a proximal mounting element. The gas piston 245 is connected to the proximal locking swivel joint 210 on a proximal mounting plate 225 using the proximal mounting element 250. The distal end 230 of the gas piston 245 is connected to the support structure 205 via the distal mounting element 240. The gas piston system is designed such that the proximal or distal ends of the gas piston 245 could be moveable relative to its mounting point on the support structure 205. For example, in some embodiments, the distal mounting element 240 is a bracket or sleeve that allows translational movement of the distal mounting element 240 along the support structure 205 while the gas piston 245 is transitioned from a compressed state to a fully-extended position or vice versa. The movement of one end of the piston system can eliminate pinch points described above. In addition, the movement of one end of the piston system can also increase the range of motion of the stirrup, compared to conventional stirrups, from a range of motion of 118° to 140°⁻ This increased range of motion meets the required clinical needs of some modern surgical procedures as described above.

Figure 3A:
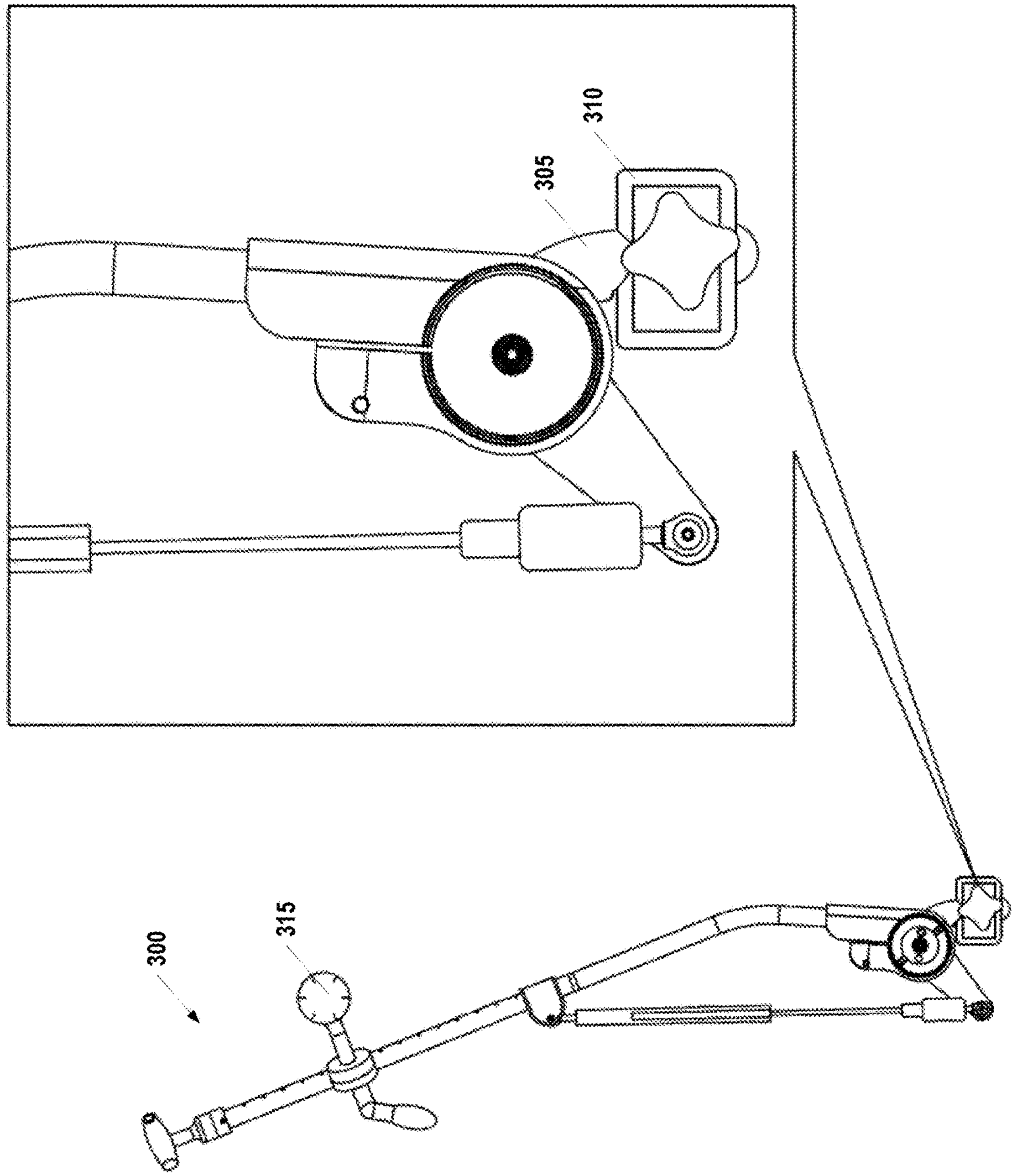
FIG. 3A shows a limb holder apparatus with a proximal locking swivel joint and boot mount apparatus, as may be used in some embodiments.
Figure 3B:
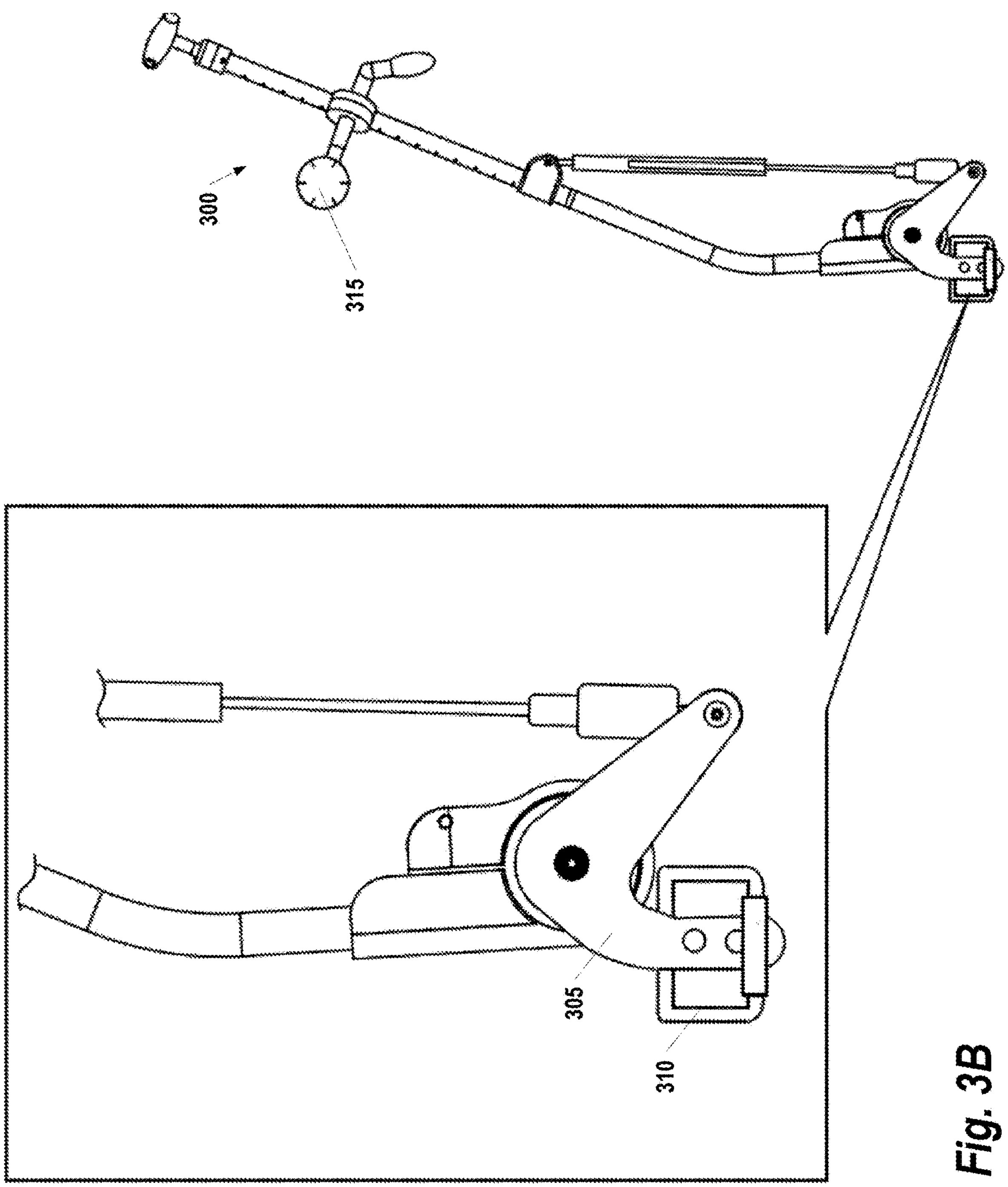
FIG. 3B shows a rear view of the limb holder apparatus shown in FIG. 3A.

FIGS. 3A and 3B show the limb holder apparatus with additional components that may be utilized in some embodiments. In these examples, the mounting blade 305 has been inserted into a table rail clamp 310 which may be used to attach the apparatus to a surgical table. The apparatus 300 shown in FIGS. 3A and 3B further includes a boot mount apparatus 315. The boot mount apparatus 315, and the use of a boot with the apparatus 300, is described in further detail below with respect to FIGS. 15A-17B.

Figure 4:
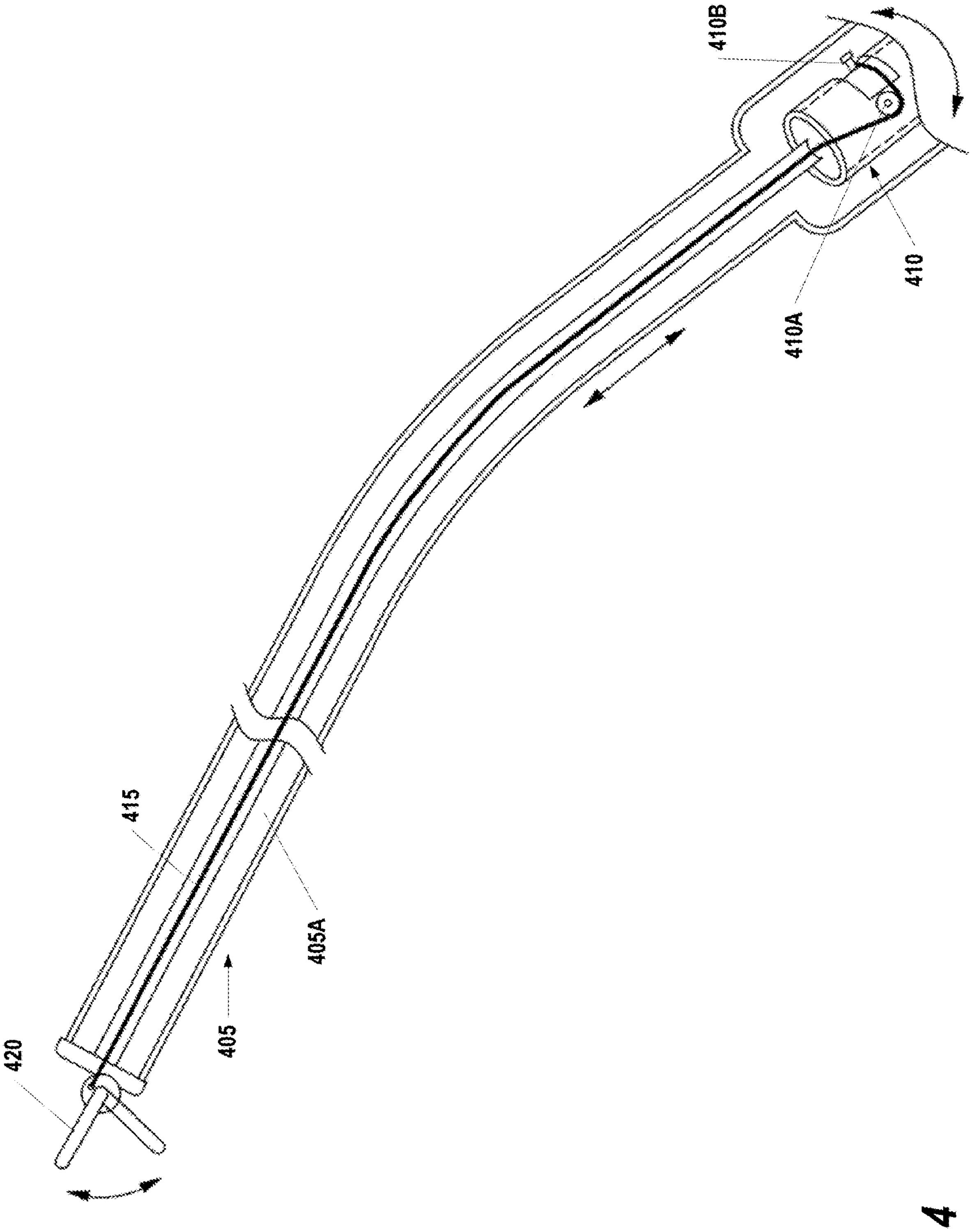
FIG. 4 shows an example of how distal actuation of a support structure may be performed in some embodiments.
Figure 5:
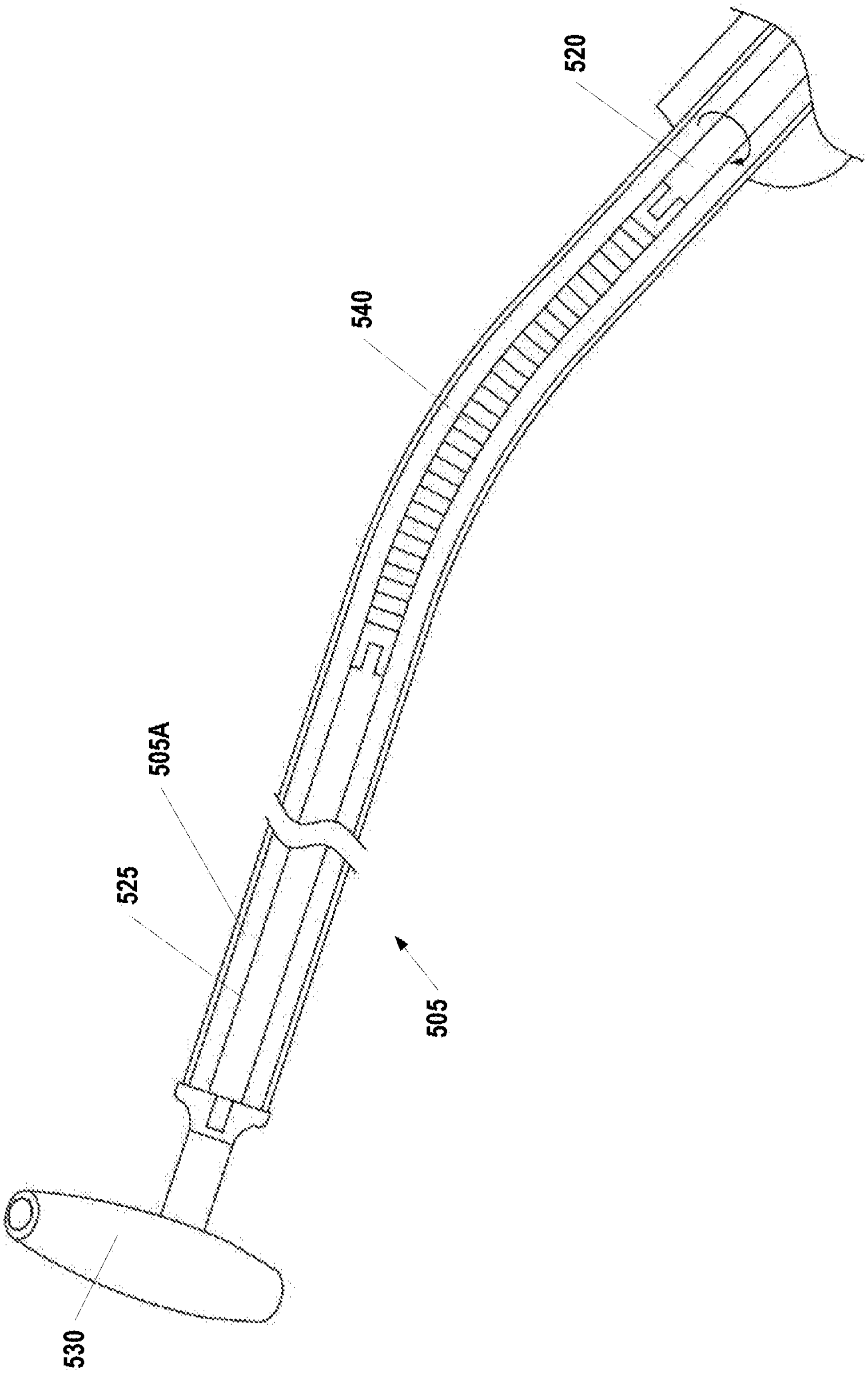
FIG. 5 shows a second example of how distal actuation of a support structure may be performed in some embodiments.
Figure 6:
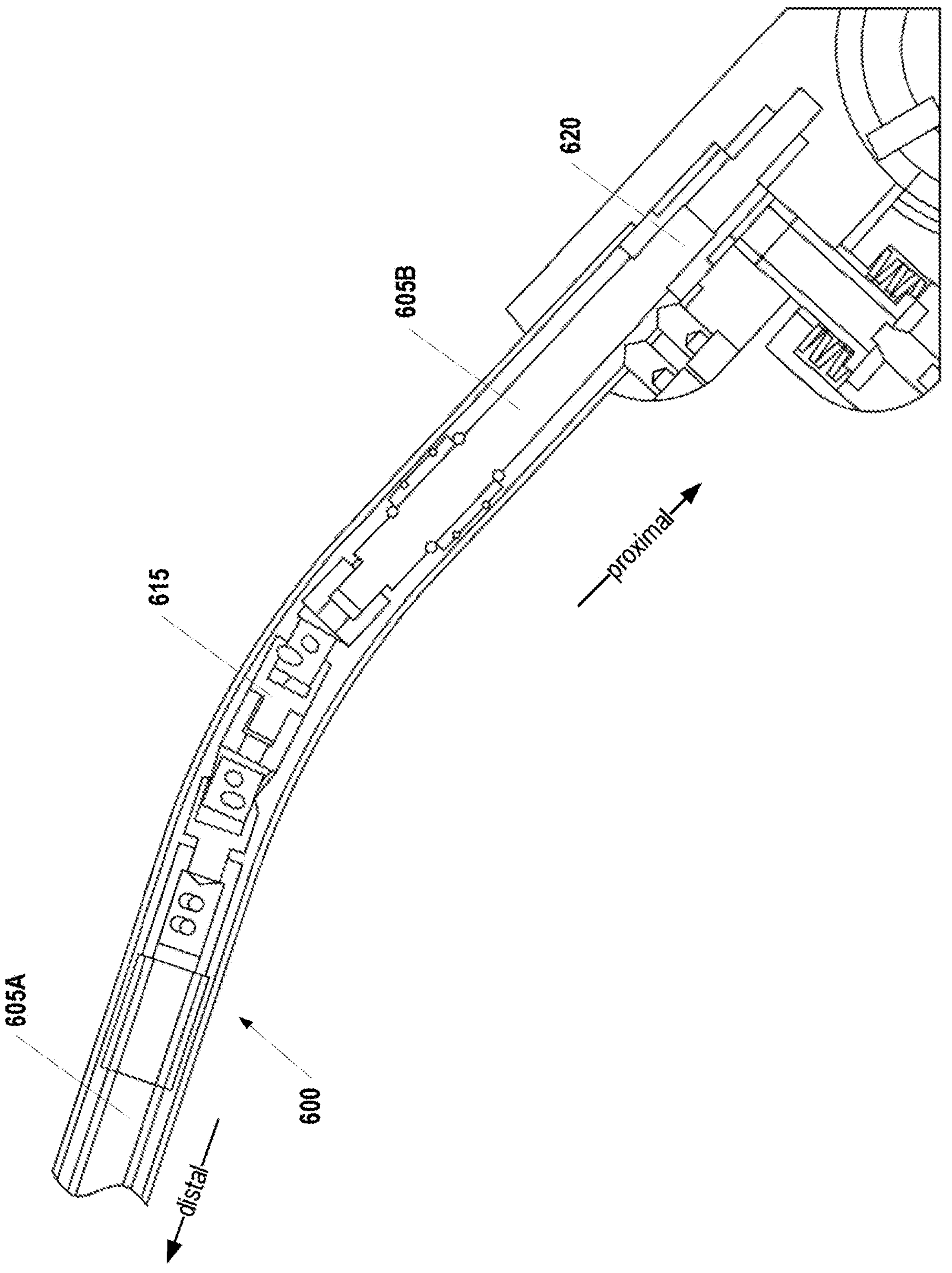
FIG. 6 shows a third example of how distal actuation of a support structure may be performed in some embodiments.

FIGS. 4-6 illustrate example techniques for providing actuation to a proximal locking swivel joint over a non-linear path through a non-linear support structure. In each of these examples, the proximal locking swivel joint is assumed to be actuated using rotational force. Thus, it may be implemented using a rotational cam or similar mechanism to act upon the proximal locking swivel joint. However, it should be understood that the general techniques shown FIGS. 4-6 may be applied to other types of proximal clamping assemblies actuated by non-rotational forces.

FIG. 4 shows the first example of how distal actuation through a non-linear support structure 405 may be performed in some embodiments. The non-linear support structure 405 in this example comprises an internal channel 405A extending along its length. A proximal locking swivel joint release mechanism 410 is located at a proximal end of the support structure 405 with respect to the surgical table. This proximal locking swivel joint release mechanism 410 has a pivot member 410A and a rotatable member 410B operable to release the proximal locking swivel joint upon activation. In one embodiment, the pivot member 410A is a pivot point that turns the cable to pull on the rotatable member 410B; however, it should be understood that other similar mechanisms may be used in different embodiments. A cable 415 connects the actuation handle 420 and the pivot member 410A (a pivot point that turns the cable to pull on the "pull-pin") through the internal channel 405A. As a user would squeeze the actuation handle 420 at the distal end of the non-linear support structure 405, pulling the cable around the pivot member 410A (a pivot point that turns the cable) which in turn pulls on the "pull-pin" (i.e., rotatable member 410B). This pulling force results in rotation of the rotatable member 410B and release of the proximal locking swivel joint.

FIG. 5 shows a second example of how distal actuation through a nonlinear support structure 505 may be performed in some embodiments. The support structure 505 in this example again includes an internal channel 505A extending along the length of the non-linear support structure 505. A proximal locking swivel joint mechanism is located at a proximal end of the support structure 505 with respect to the surgical table. The proximal locking swivel joint mechanism comprises one or more rotatable members 520 that, when rotated, cause release of the proximal locking swivel joint. An actuation rod 525 is located in the internal channel of the support structure. In example of FIG. 5, the actuation rod 525 is straight; however, it should be understood that in other embodiments actuation rods that are not entirely straight may be employed. For example, in one embodiment, the actuation rod is comprised of segments each disposed at angle with respect to one another.

In some embodiments, rather than using a single actuation rod, multiple actuation rods may be used. The distal end of the straight actuation rod 525 is coupled to an actuation handle 530. In the internal channel 505A, one or more flexible torsion drives 540 are coupled to straight actuation rod 525 and the rotatable members 520. In response to a user rotating the distal actuation handle 530 about the axis generally aligned with the distal end of the support structure 505, the rotatable members in the proximal locking swivel joint mechanism rotate, thereby causing release of the proximal locking swivel joint.

FIG. 6 shows a third example of how distal actuation may be performed in some embodiments. Actuation rods 605A, 605B are located in an internal channel of the non-linear support structure 600. These actuation rods 605A, 605B are coupled to a distal actuation handle (not shown in FIG. 6). One or more universal joints 615 are coupled to the proximal end of actuation rod 605A and the distal end of actuation rod 605B. One or more rotatable members 620 are operable to activate a proximal locking swivel joint mechanism upon rotation of the rotatable members 620. As a user rotates distal the actuation handle (not shown in FIG. 6) about an axis generally aligned with actuation rod 605A, the rotatable members 620 rotate and release the proximal locking swivel joint.

Figure 7:
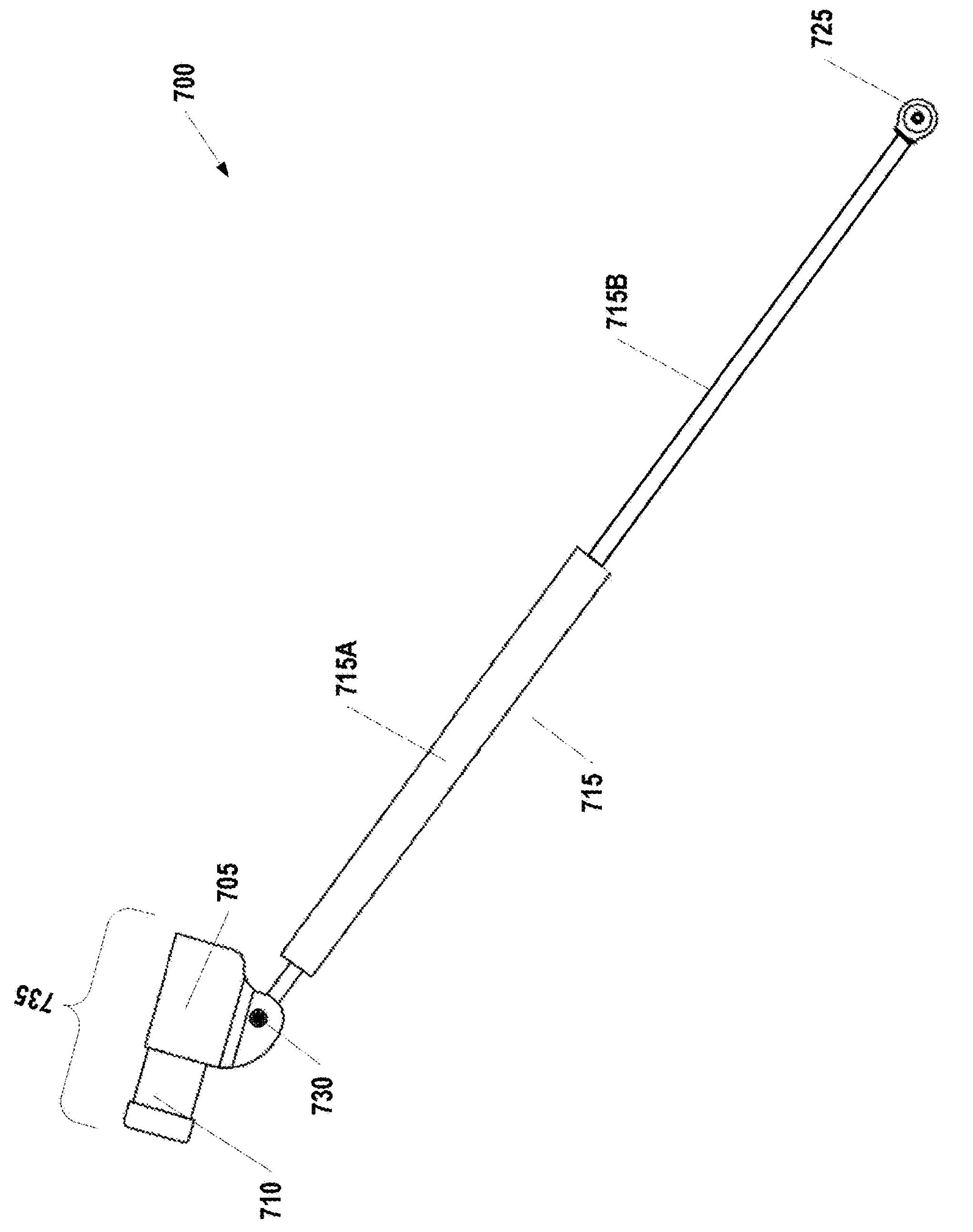
FIG. 7 provides an example gas piston system with a distal sliding mechanism that is used in one embodiment.

As noted above with respect to FIGS. 2A and 2B, in some embodiments, the apparatuses described herein utilize a gas piston system to provide additional reinforcement to the support structure while in use. FIG. 7 provides an example gas piston system 700 that is used in one embodiment. In this embodiment, the gas piston system 700 includes a mount with sleeve 705 that is attached to collar 710. The distal end of gas piston 715 is coupled to the sleeve 705 by distal attachment component 730, and allowed to rotate freely about the axis of distal attachment component 730. Collar 710 is fixed to the distal portion of the support structure 205 (FIG. 2A/B) while the inside surface of sleeve 705 is free to slide axially along the outside of the collar 710. Collar 710 does not move relative to the support structure but is attached the support structure by attachment components 810A (see FIG. 8), while the sleeve 705 is not directly attached to the support structure but slides axially along slotted guide 905 interface in collar 710 (see FIG. 9), and is limited in its axially sliding range (and from rotation about the axis of the support structure 205) by attachment component 810B in FIG. 8 and FIG. 9. The sliding occurs when the support structure is raised into high lithotomy position and the gas piston reaches its extended limit, allowing the entire support structure to move beyond the point that the normal extended limit of the gas piston, without sliding, would otherwise permit. The distal sliding mechanism remains extended in the high lithotomy position (approximately 65 to 90 degrees) until the support structure is lowered. As it is lowered, the distal sliding mount assembly 735 is compressed until it reaches a fully compressed state at which point the gas piston becomes engaged and begins to compress below the 65 degree lithotomy point. Below this 65 degree position the gas piston (+65 degrees to −55 degrees) remains in compression. In all embodiments it is understood that the gas piston could be substituted by a hydraulic system, linear actuator, or similar support/reinforcement mechanisms.

Figure 8:
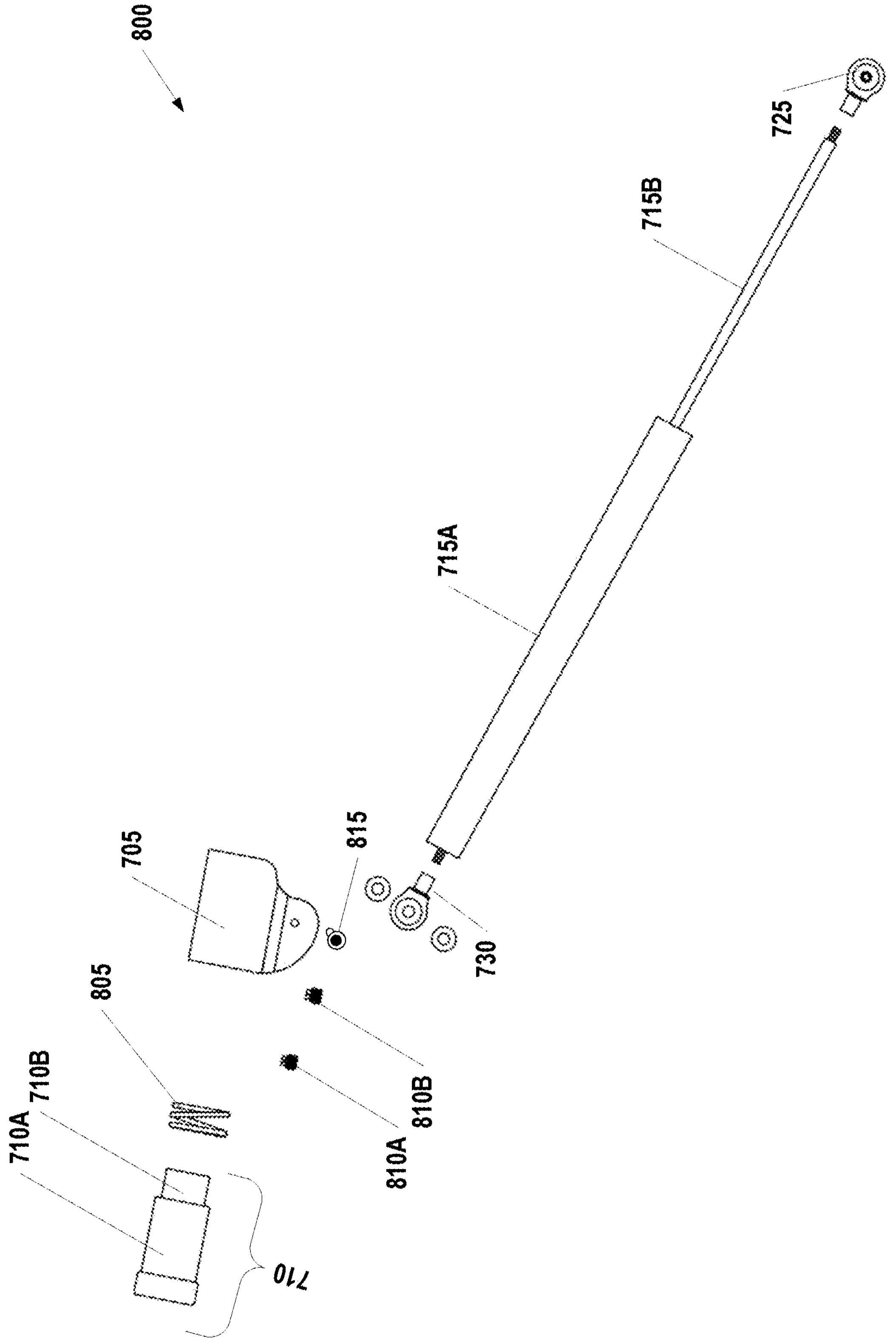
FIG. 8 provides an exploded view of one embodiment of the sliding mechanism used in the gas piston system shown in FIG. 7.

FIG. 8 provides an exploded view 800 of the example gas piston system 700 shown in FIG. 7. As shown in this embodiment, the collar 710 includes an upper neck 710A and a lower neck 710B. The lower neck 710B is smaller than the upper neck 710A in order to mate with spring 805. The ridge at the interface between upper neck 710A and lower neck 710B creates a perpendicular surface to the axis of spring 805, allowing a surface for the spring 805 to exert force. The other end of spring 805 exerts force on the bottom of the counter-bored cavity in sleeve 705. The spring 805 is fitted over lower neck 710B and aids in the movement of gas piston system 700 between the fully extended position and a compressed position (i.e., when piston strut 715B is inserted into the gas cylinder 715A). Attachment component 810A (a set screw in this embodiment) is used to connect the collar 710 to the distal portion of support structure 205 (FIGS. 2A/2B). Attachment component 810B limits the axial range of motion of sleeve 705 along the upper neck of 710A of collar 710 and resists rotation about the axis of collar 710, and, consequently about the distal support axis 170 (FIG. 1B).

Figure 9:
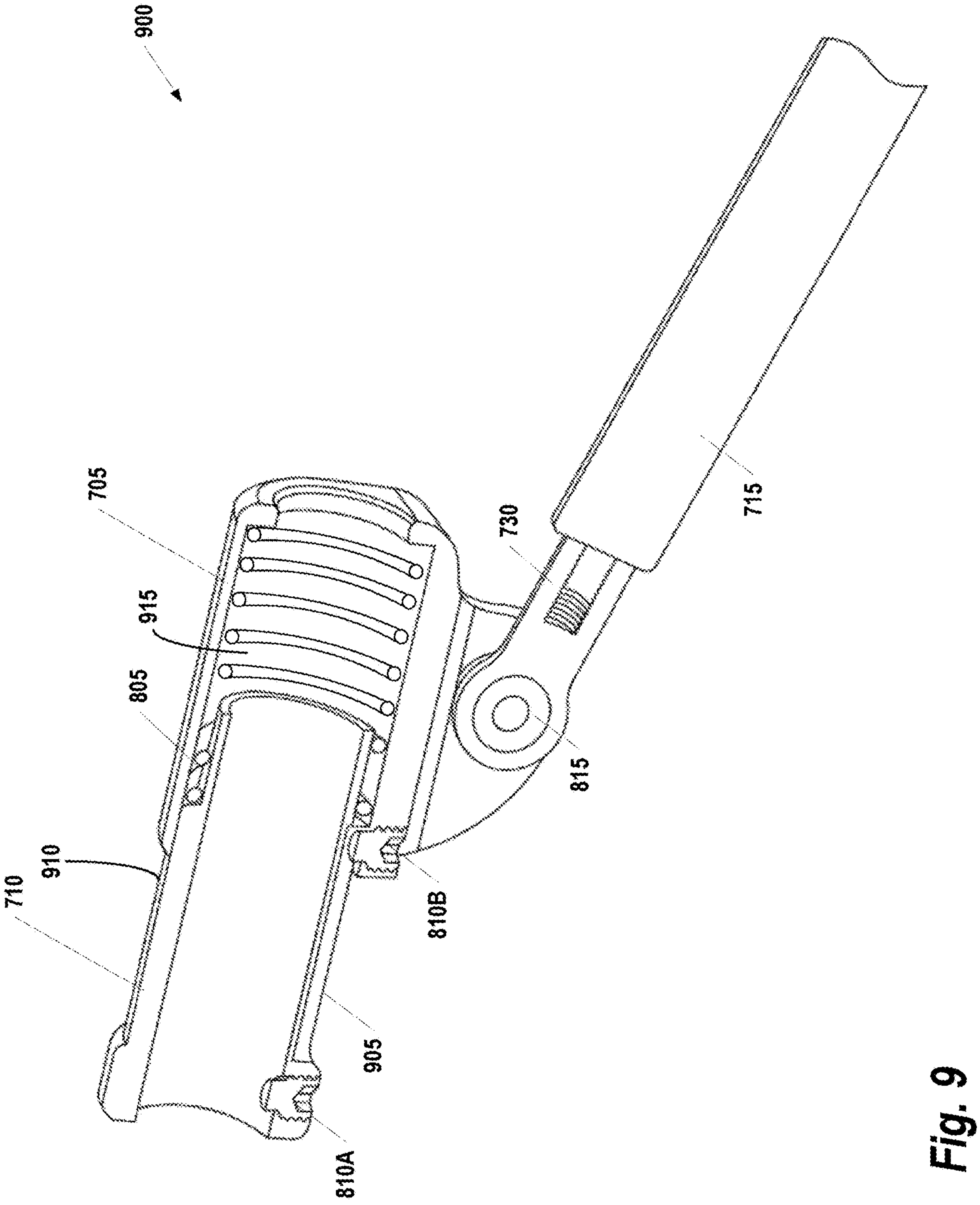
FIG. 9 provides a cut away view of the example gas piston system shown in FIG. 7.

FIG. 9 shows cross section view 900 of interface between collar 710 and sleeve 705. Outer surface 910 of upper neck 710A slides inside inner surface 915 of sleeve 705. Pin 810B limits range of motion and rotation of sleeve 705 about distal support axis 170 (FIG. 1 B) by the confinement in slotted guide 905 of collar 710. Attachment 730 enables attachment of gas piston 715 to sleeve 705 at attachment point 815. Attachment 730 has a spherical bearing at attachment point 815, allowing rotation about 815 during movement of the support system about the lithotomy axis 160 (FIG. 1B) and lateral motion during movement of the support system about the abduction/adduction axis 155 (FIG. 1B). Attachment components 810A and 810B are shown in FIG. 9 as being set screws; however, it should be understood that various forms of attachment (such as pins, dowel, rods, etc.) may be used at each attachment point.

In the examples of FIGS. 7-9, it is assumed that the proximal attachment of 725 is fixed in position, but allowed to rotate freely about the axis of attachment screw as the support structure moves about the lithotomy axis 160 (FIG. 1B) and lateral motion, as the support structure moves around the abduction/adduction axis 155 (FIG. 1B). That is, as the gas piston is extended and compressed, the proximal attachment 725 remains fixed. In contrast, the distal end of the piston system moves parallel along the distal support axis 170 (FIG. 1 B) of support structure as is described above. As an alternative, the distal mounting components (e.g., the sleeve) may remain fixed and the proximal end of the piston system may allow movement. This alternative design is illustrated in FIG. 10-14.

Figure 10:
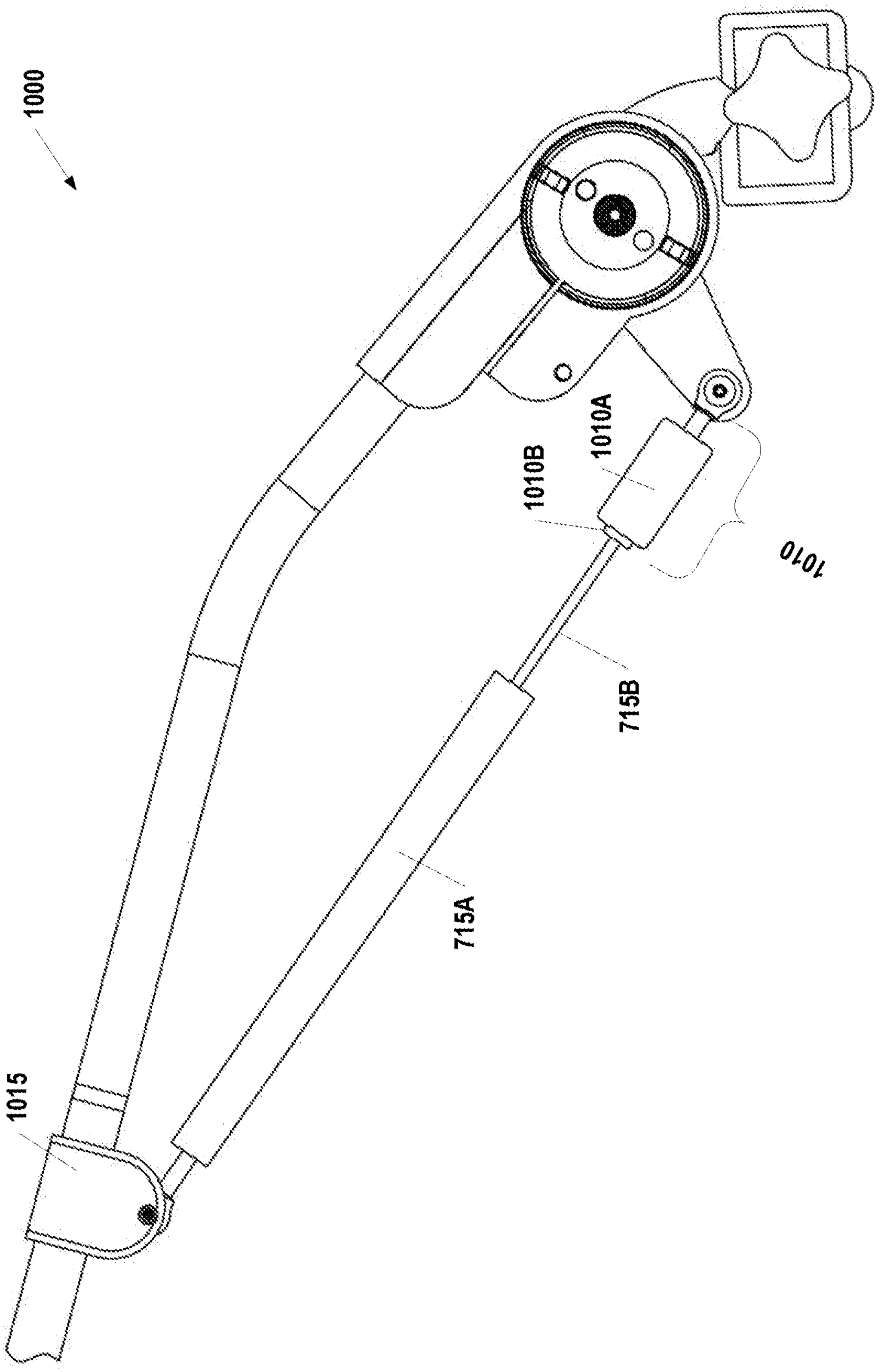
FIG. 10 provides a close up view of another embodiment with a proximal sliding mechanism used in a gas piston system with the gas piston partially compressed.
Figure 11:
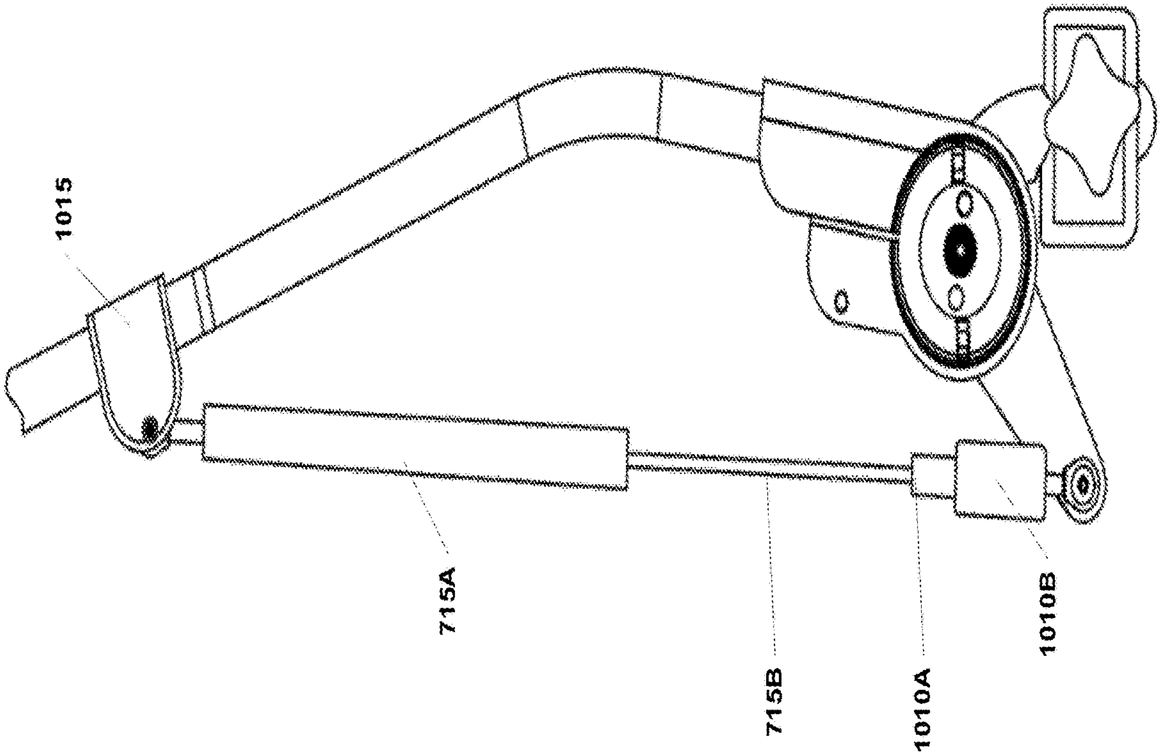
FIG. 11 shows the gas piston system illustrated in FIG. 10 in a fully-extended position.

FIG. 10 provides a close up view 1000 of a partially compressed gas piston 715 with a proximal sliding gas spring mount 1010. In this example, the distal mount 1015 is fixed. However, in other embodiments, the proximal sliding gas spring mount 1010 may be used in conjunction with a distal sliding mount assembly 735 (FIG. 7). FIG. 11 shows the apparatus in a fully-extended position. In this position, proximal collar 1010A is shown, which is designed to move with respect to the proximal sleeve 1010B, thus providing movement of the overall gas piston system. The distal end of the proximal sliding gas spring mount 1010 is connected to the proximal end of piston strut 715B via this proximal collar 1010A.

Figure 12:
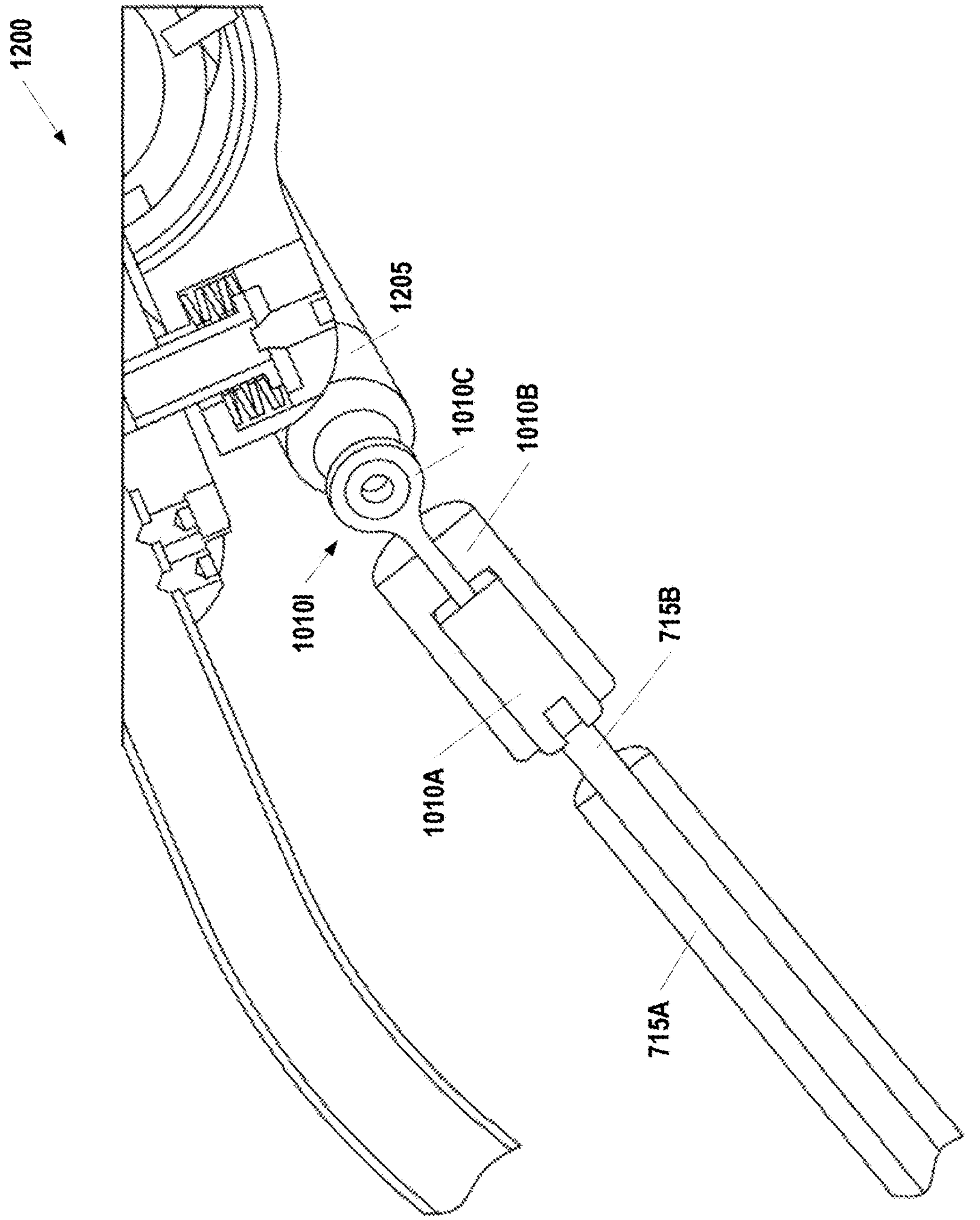
FIG. 12 provides a cutaway view of a gas piston system with a proximal sliding mechanism used in the gas piston mount while the gas piston is compressed.

FIG. 12 provides a cutaway view 1200 of the proximal sliding gas spring mount 1010 while the gas piston 715 is compressed. As shown, the proximal collar 1010A resides inside of a proximal sleeve 1010B (described below with respect to FIG. 13). A threaded attachment component 1010C attaches a proximal end of the proximal sliding gas spring mount 1010 to the mounting post 1205, thereby attaching the proximal sliding gas spring mount 1010 to the proximal mounting plate 225 (FIG. 2A). Attachment component 1010C has a spherical bearing at attachment point 10101, allowing rotation as the support structure moves about the lithotomy axis 160 (FIG. 1B), and lateral motion as the support structure moves around the abduction/adduction axis 155 (FIG. 1B).

Figure 13:
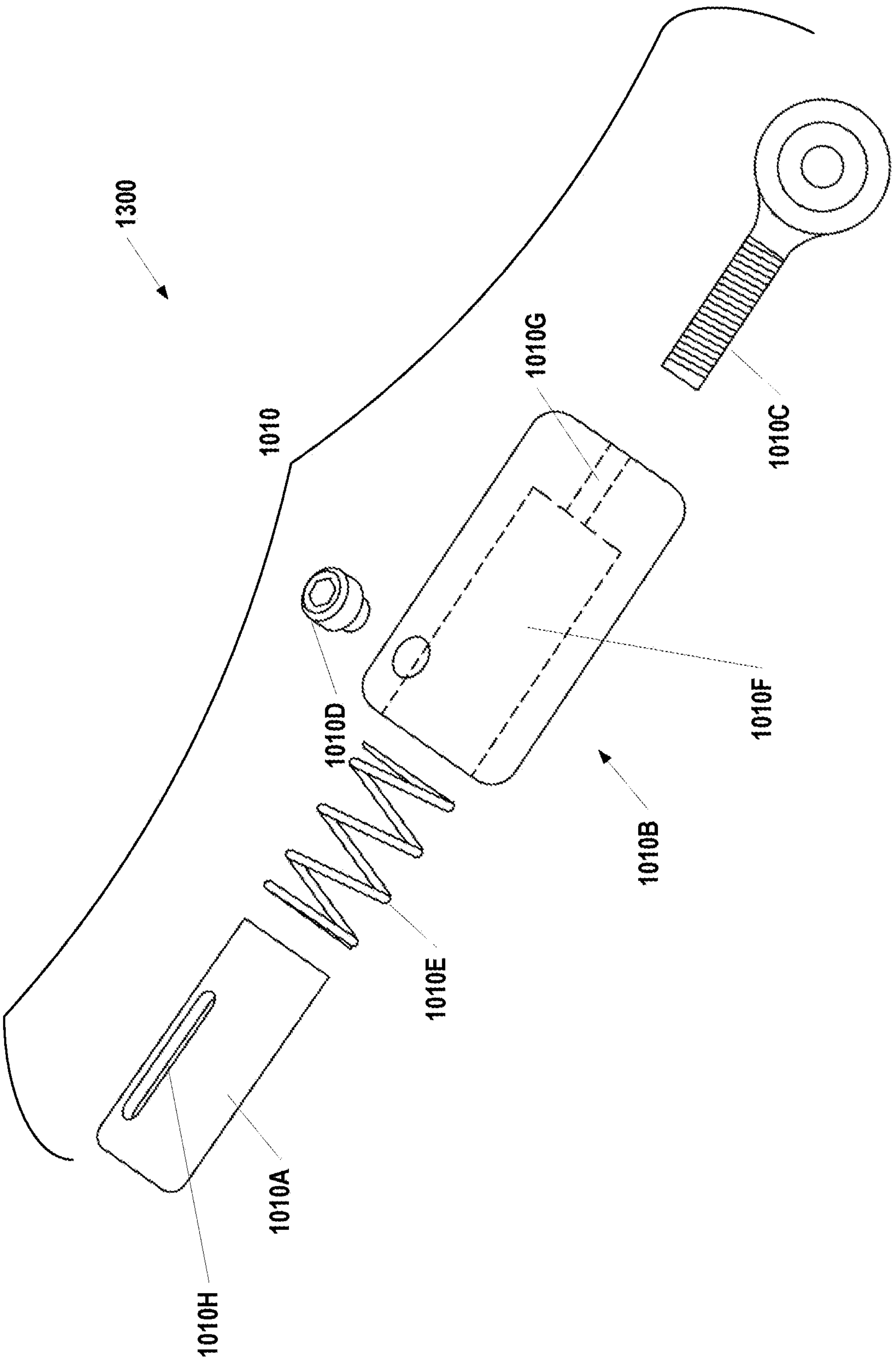
FIG. 13 provides an exploded view of a proximal sliding mechanism of the gas piston mount.

FIG. 13 provides an exploded view 1300 of the proximal sliding gas spring mount 1010, according to some embodiments. As shown in this illustration, the proximal sleeve 1010B includes an inner pocket 1010F and a threaded opening 1010G. On the proximal end of the proximal sliding gas spring mount 1010, the threaded attachment component 1010C is connected to the threaded opening 1010G. A biasing compression spring 1010E is located inside the inner pocket 1010F to create tension as the proximal collar 1010A is pushed into the pocket of proximal sleeve 1010B by the force of the compressed gas piston. Set screw 1010D is fixed to proximal sleeve 1010B and has an extended tip to engage slotted guide 1010H into the proximal collar 1010A. The proximal sleeve 1010B is inserted over the biasing compression spring 1010E into the inner pocket 1010F. A set screw 1010D is inserted into a slotted guide 1010H in the proximal collar 1010A, limiting the axial range of motion and resisting axial rotation. It should be noted that slotted guide 1010H could be an annular cut-out limiting axial range of motion but allowing free rotation. Proximal collar 1010A is inserted with biasing compression spring 1010E into inner pocket 1010F of proximal sleeve 1010B thus creating a continuous force pushing proximal collar 1010A out of inner pocket 1010F. The set screw 1010D engagement with slotted guide 1010H resists the proximal collar 1010A from being pushed out of inner pocket 1010F. Although set screws are discussed in this embodiment it is understood that pins, dowels or other mechanical attachment devices can be employed.

Figure 14A:
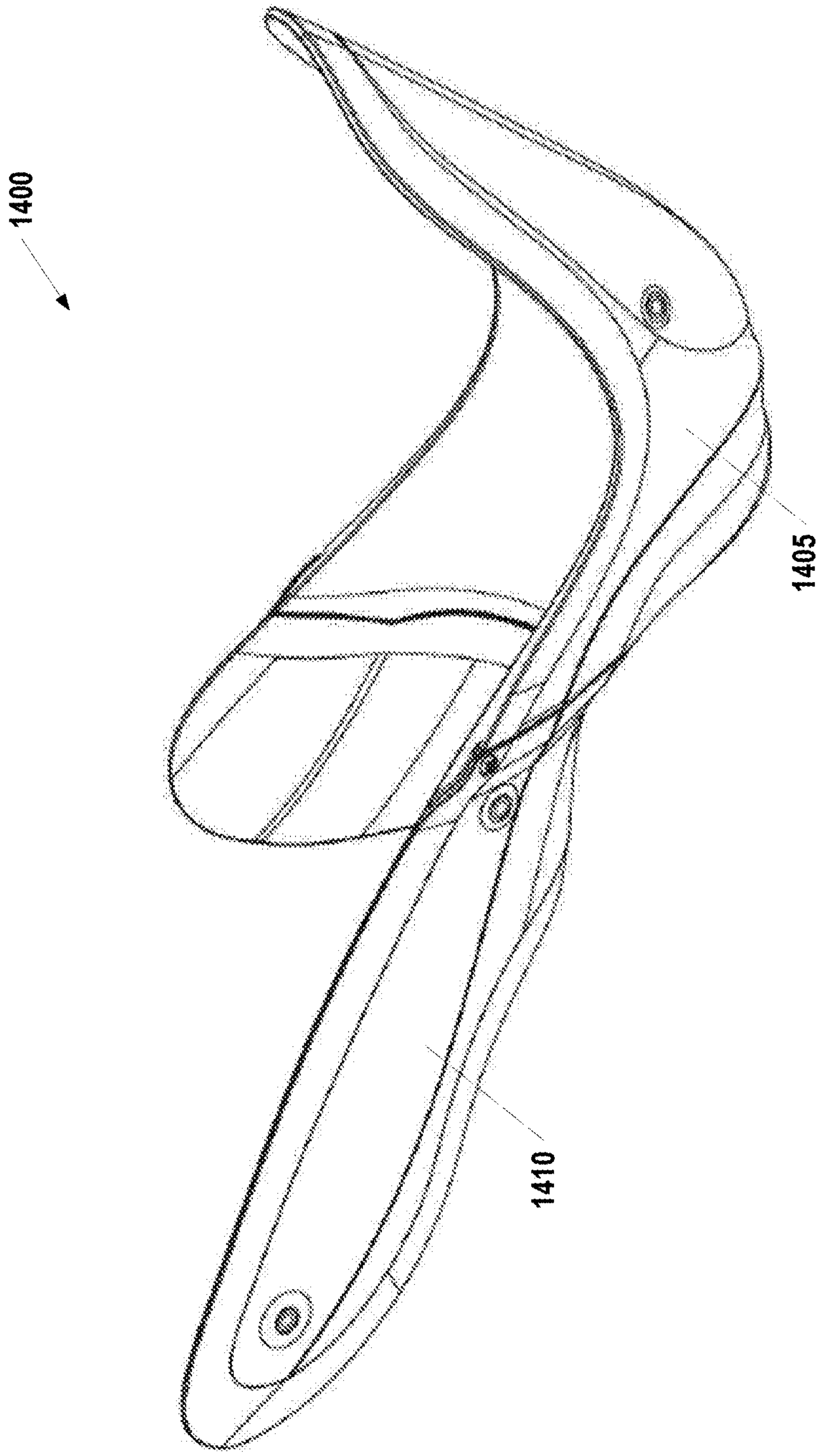
FIG. 14A shows an example support boot that may be used in some embodiments.
Figure 14B:
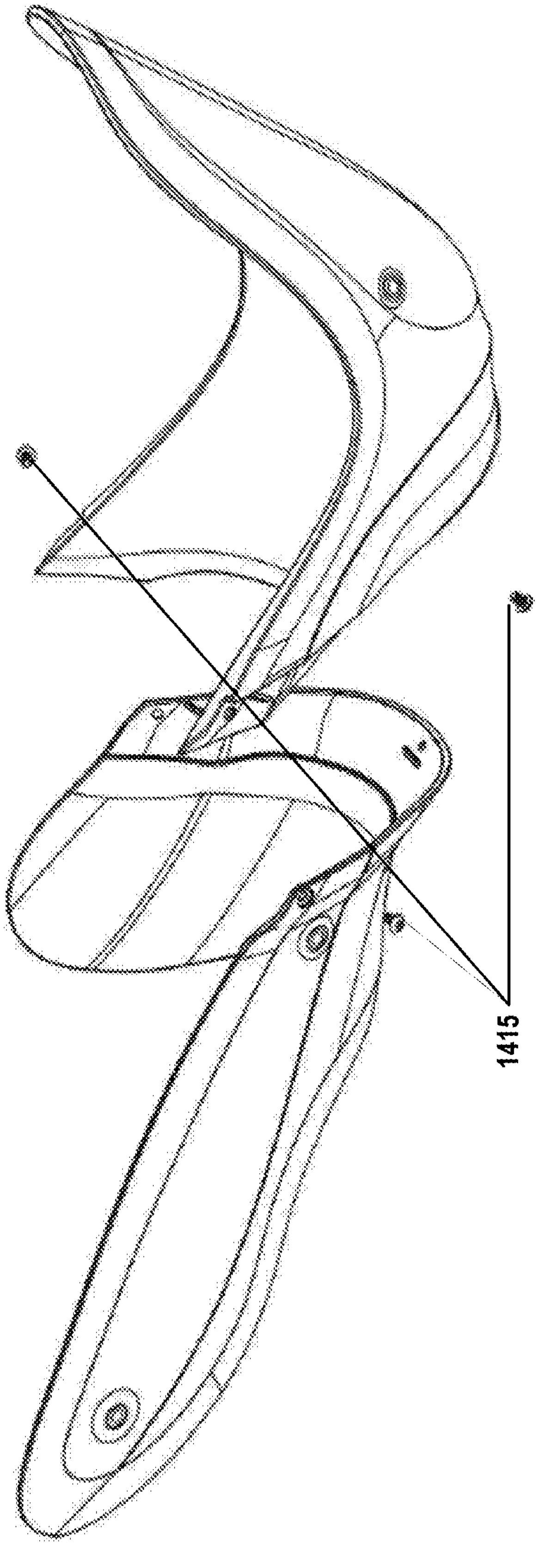
FIG. 14B provides an additional view of the support boot shown in FIG. 14A.

Each foot of the patient is held in a support boot during the surgical procedure. FIGS. 14A and 14B show an example support boot 1400 that may be used in some embodiments. The support boot 1400 includes a foot section 1405 and an upper element 1410. The foot section 1405 is "ambidextrous," meaning that it can be used in both left foot and right foot configurations of the support boot 1400. Conversely, the upper element 1410 is specific to the side of the patient's body. Thus, for a left foot, the upper element 1410 includes a calf section shaped for a left leg; while, a calf section shaped for a right leg is used for a right foot. As shown in FIG. 14B, the foot section 1405 and an upper element 1410 are connected using mechanical fasteners 1415. However, in other embodiments, fusion bonding or other similar techniques may be used for joining the two components 1405, 1410.

The foot section 1405 is substantially rigid to provide full support to the foot during the surgical operation. In this context, "substantially rigid" means that the foot section 1405 is constructed of plastic or similar material with sufficient thickness to provide little or no flexibility when a bending force is applied thereto. For example, in some embodiments, the foot section 1405 is ⅛"-1" in thickness. The upper element 1410 is designed using a flexible material that allows minor adjustments, as needed, to fit the patient's calf. The upper element 1410 may also be designed with plastic or a similar material. In some embodiments, the upper element 1410 ranges from ⅛" to ¼" in thickness to provide the requisite flexibility.

In some embodiments, the support boot 1400 includes a top flap element (not shown in FIGS. 14A and 14B). One or more flexible straps may be used to secure the top flap element over the foot section 1405 and the upper element 1410 during surgical procedures. For safety, these straps may be constructed of non-porous materials to ensure that blood, body fluids, or other bio-hazardous materials are not inadvertently collected in the straps during surgical procedures. In one embodiment, silicone is used for construction of the straps; however, in general, any non-porous material may be employed.

Figure 15A:
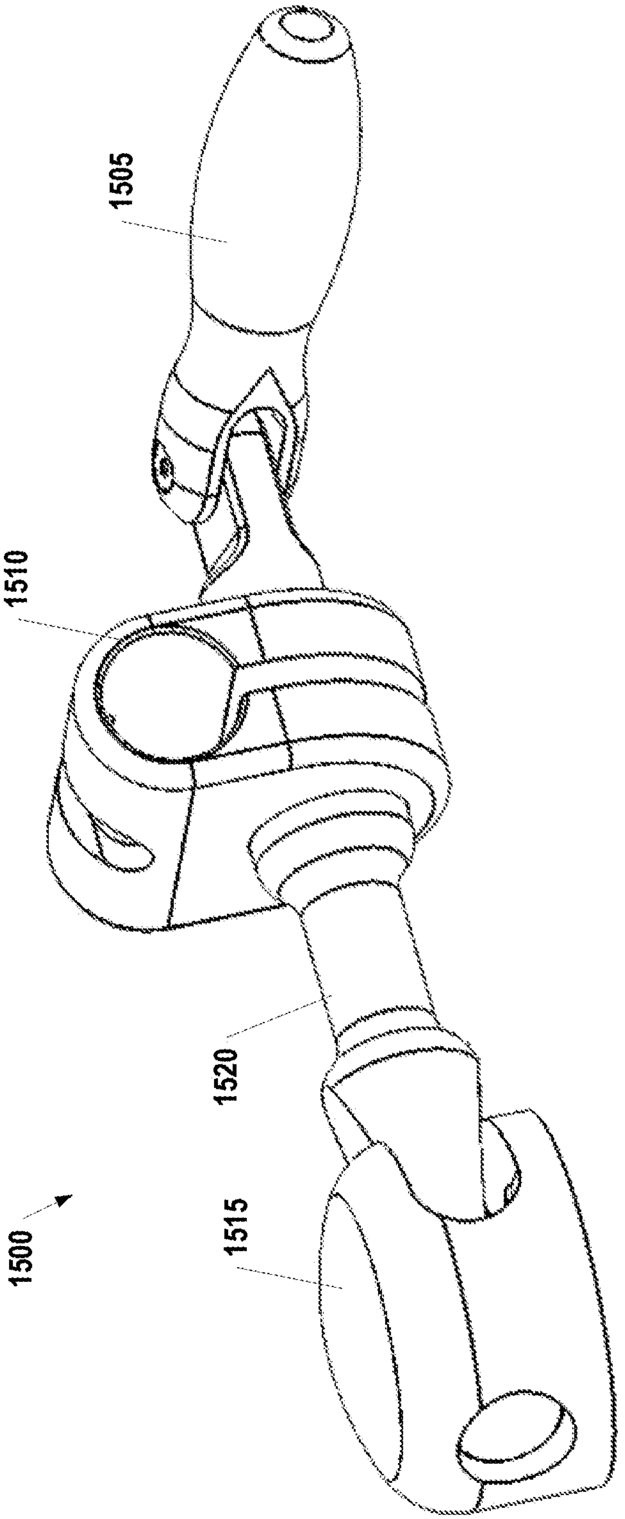
FIG. 15A illustrates an example moveable boot mount apparatus for connecting the support boot to the distal portion of the support structure of the limb holder apparatus.
Figure 15B:
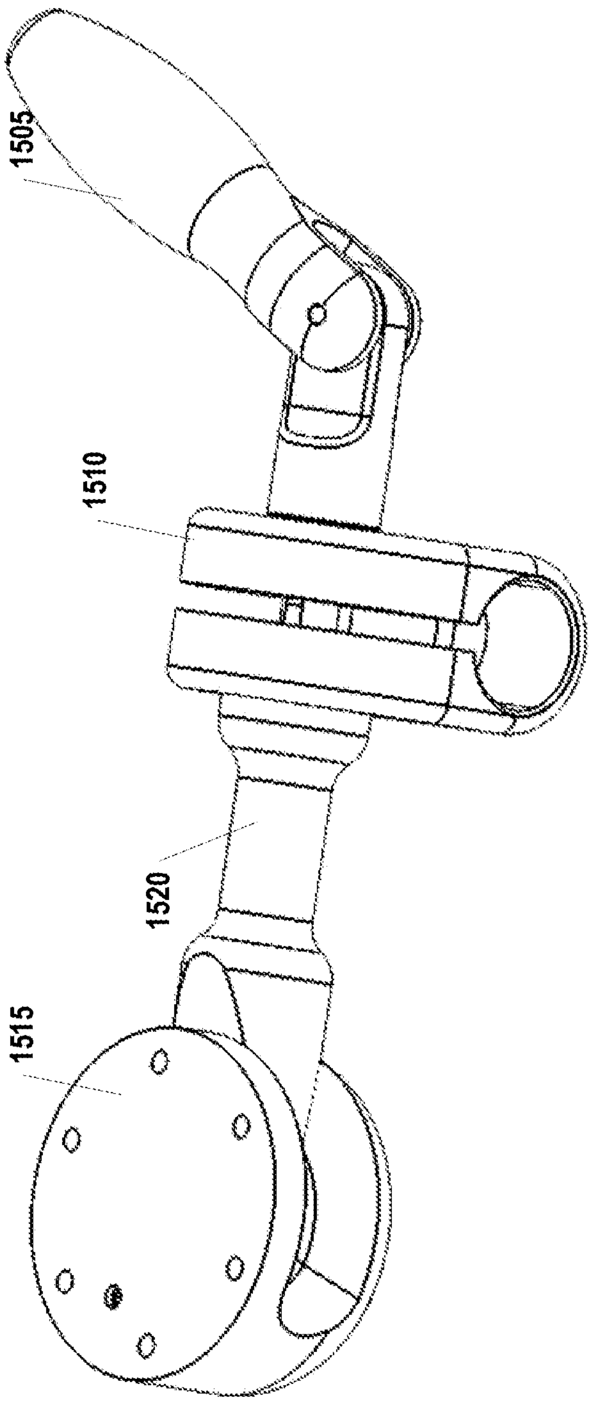
FIG. 15B provides an alternate view of the boot mount apparatus shown in FIG. 15A.

FIGS. 15A and 15B illustrate an example of a conventional moveable boot mount apparatus 1500 for connecting the support boot to the distal portion of the support structure of the limb holder apparatus (see FIGS. 3A and 3B). The support boot is mounted on a boot mount surface 1515 attached to housing 1520. This moveable boot mount apparatus 1500 allows the release of the support boot with respect to the support in four simultaneous degrees of freedom (along and about the distal support axis 170 (FIG. 1B), about the boot float axis 145 (FIG. 1 B), and about the medial/lateral axis 150 (FIG. 1 B)). The conventional systems that require the concurrent release of the leg (or locking) of all degrees of freedom of motion can potentially place great strain upon the clinician when moving the patient's foot or leg.

For the moveable boot mount apparatus 1500 shown in FIGS. 15A and 15B, the support structure is inserted in mounting sleeve 1510. Actuation handle 1505 is used to lock and unlock the mounting sleeve 1510 to the support structure. In this example, the actuation handle 1505 engages with a threaded connection to lock and unlock the degrees of freedom simultaneously.

Figure 16A:
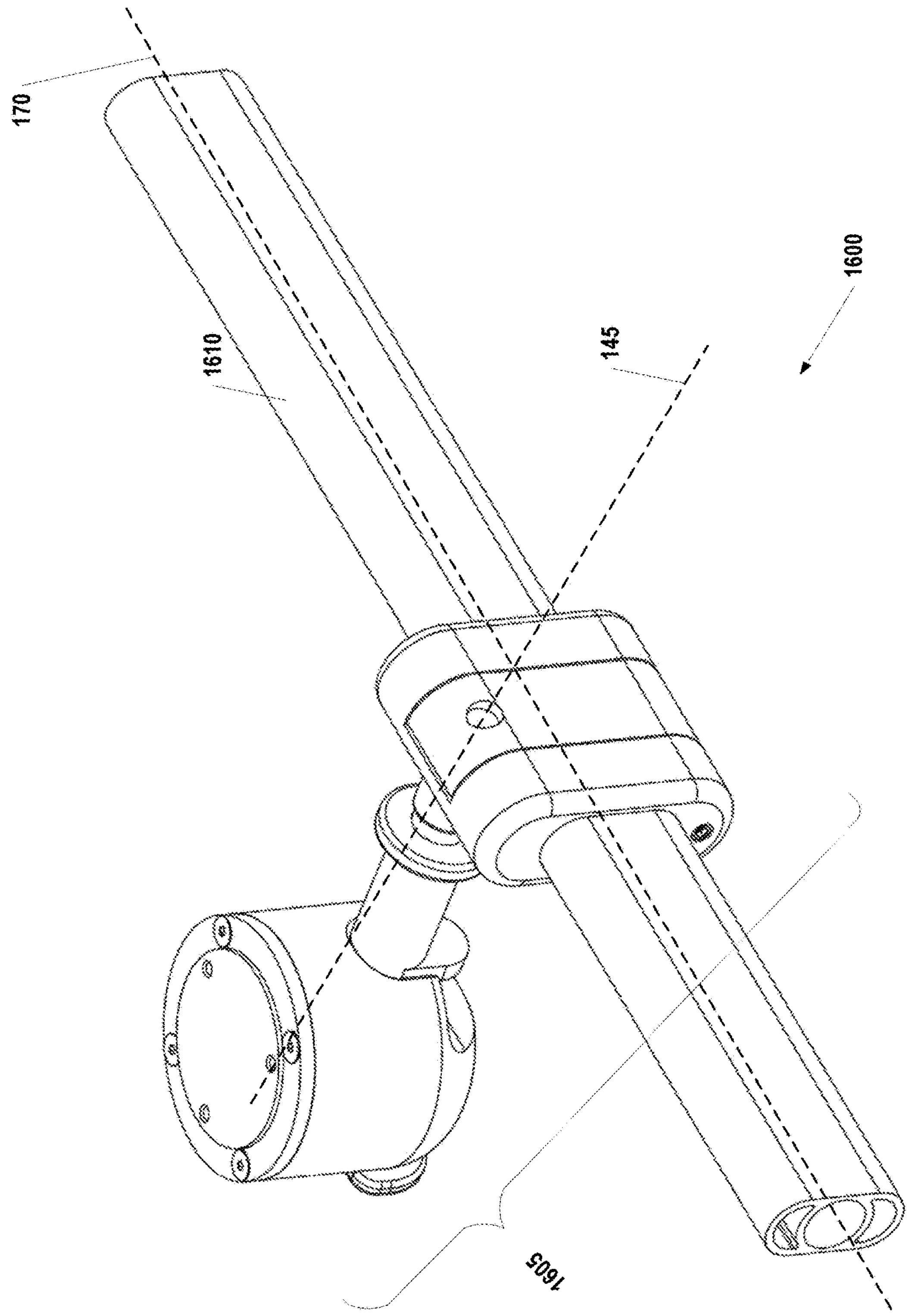
FIG. 16A provides an illustration of an alternate boot mount apparatus according to some embodiments.

FIG. 16A provides an illustration of an alternate boot mount system 1600 according to some embodiments. Briefly, in this view, the boot mount system 1600 comprises a support structure 1610 having an axis which generally defines a path of boot motion along the distal support axis 170. A boot mount apparatus 1605 couples a surgical boot (not shown in FIG. 16A) to the support structure 1610. The support structure 1610 has a cross section, in this embodiment, that is oblong to resist rotation about the distal support axis by any member mounted along it. It is understood that in other embodiments the support structure 1610 could have cross sections that are circular with plinths, rectilinear, trapezoidal or other cross sections that would resist rotation of a member mounted along it. This boot mount apparatus 1605 selectively enables and disables at least three degrees of motion. First, the boot mount apparatus 1605 may selectively allow motion generally parallel with the distal support axis 170 while resisting rotational motion about the distal support axis 170. Secondly, the boot mount apparatus 1605 may allow rotation about the boot float axis 145 which is generally perpendicular to the distal support axis 170. Finally, the boot mount apparatus 1605 may allow rotation about at least one other axis (the medial/lateral axis 150 (FIG. 1B)). A selective release mechanism in the boot mount apparatus 1605 allows for the selective and independent release of motion of the boot generally along the distal support axis 170. The details of how this selective release mechanism is constructed and operates are described in the following paragraphs.

Figure 16B:
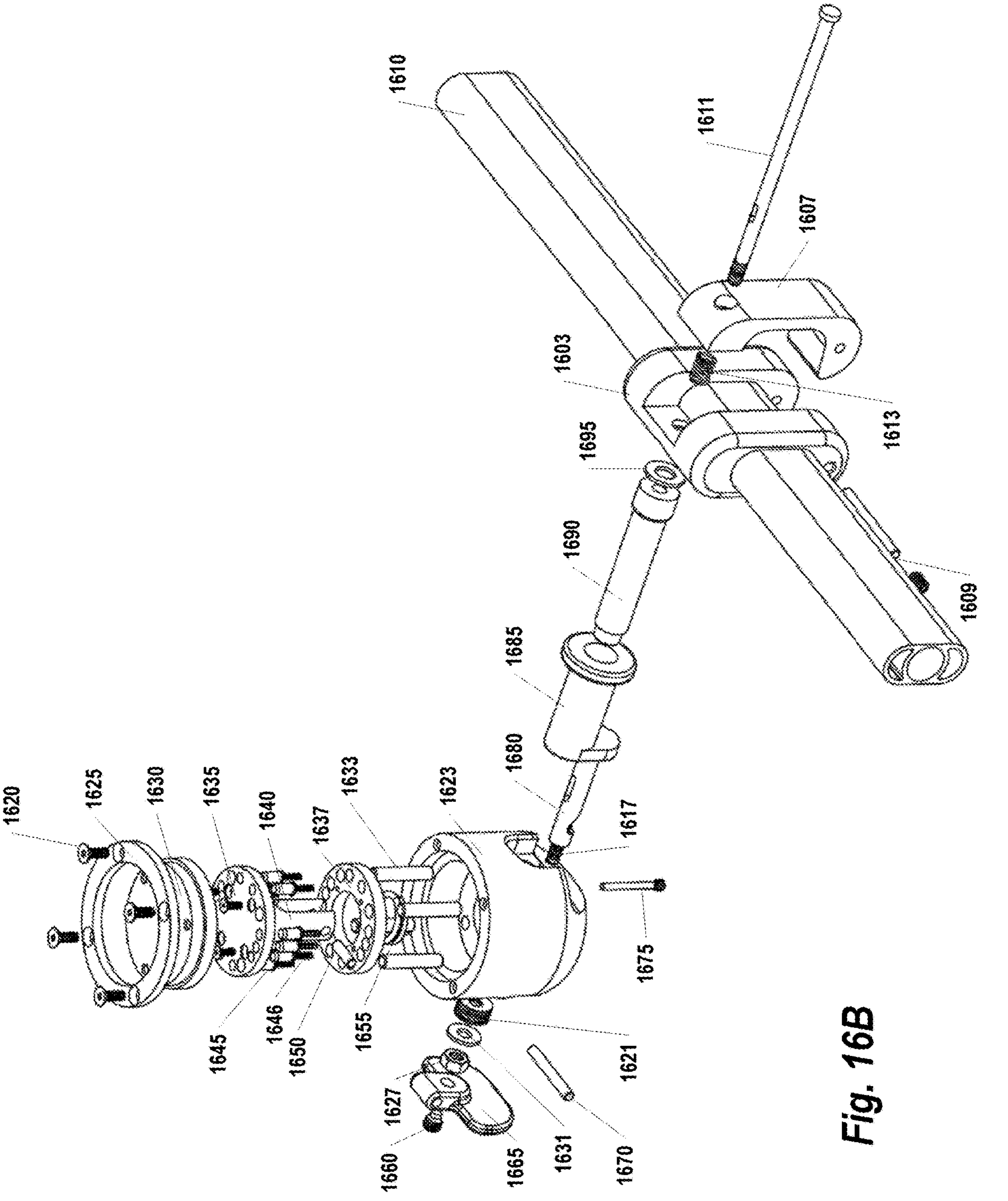
FIG. 16B provides an exploded view of the alternate boot mount apparatus according to some embodiments.

FIG. 16B provides an exploded view of the alternate boot mount system 1600 according to some embodiments. Within the housing 1623, a series of components are used to provide selective control of the boot mount apparatus. Starting at the top, retaining ring screws 1620 attach the retaining ring 1625 to housing 1623 and thus enclosing the other components. The support boot is mounted to the boot mount ring 1630 and the pin ring 1635 facilitates raising and lowering pins which determine the rotation position about the medial/lateral axis 150 (FIG. 1B). Rotation release roller 1640, rotation roller pin 1650, and pin bias spring 1655 facilitate the engagement and disengagement of pin ring 1635 with the boot mount ring 1630. A pin bias spring 1655 pushes the pin ring 1635 against the boot mount ring 1630 when the actuation mechanism is not engaged. The pin retaining ring 1637 houses engagement pins 1645 and the pin springs 1646 together in place. Rotation lock dowels 1633 align the housing 1623 and the pin retaining ring 1637. Activation of the rotation release button 1680 drives downward the pin retaining ring 1637 enabling rotation motion about the medial/lateral axis 150 (FIG. 1B). Threaded dowel with set screw 1675 is fitted through slots in rotation release button 1680 and slide lock pull rod 1611 and through mating holes in housing 1623 to secure these members.

Figure 16C:
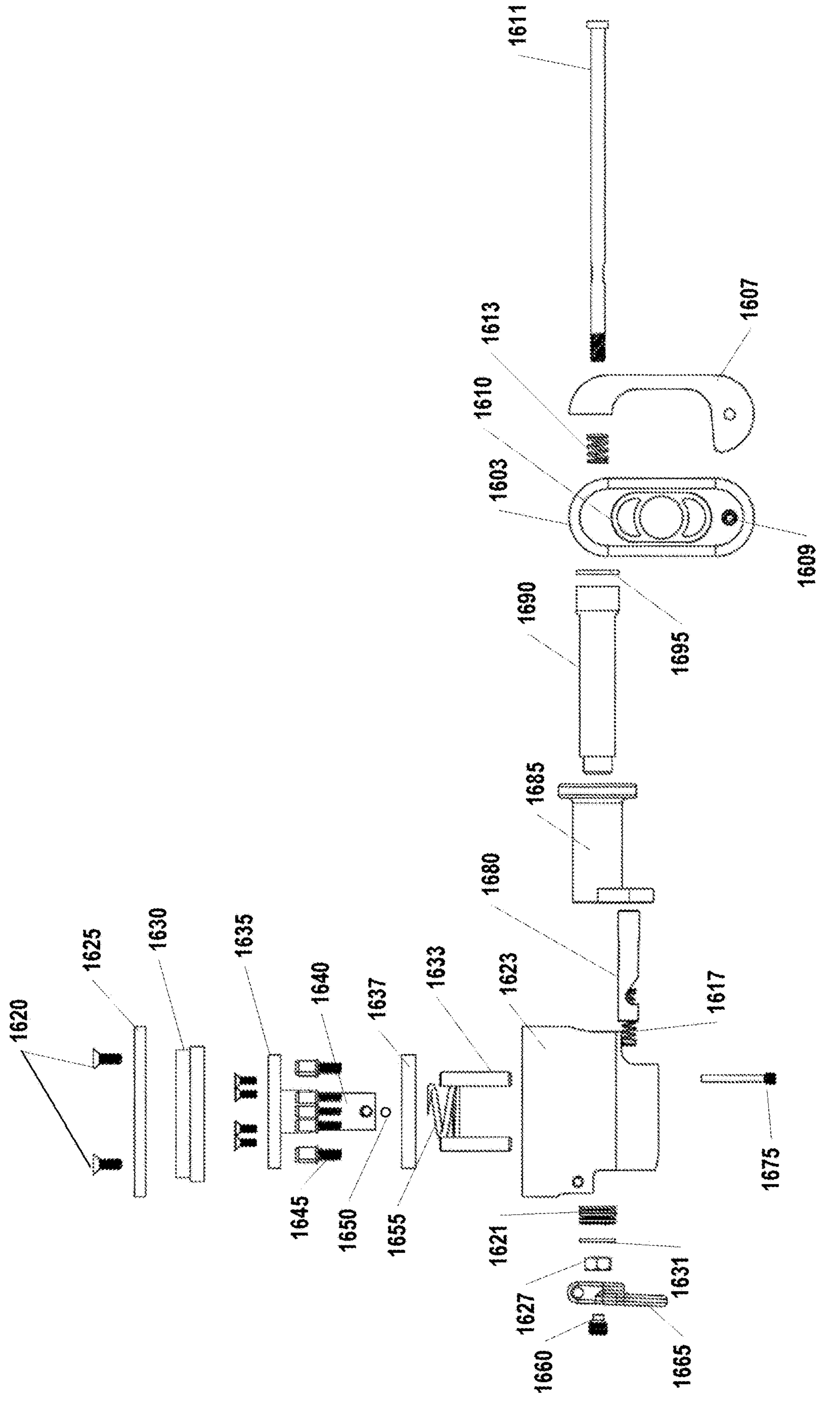
FIG. 16C shows the exploded view presented in FIG. 16B at a different angle.

Continuing with reference to FIG. 16B, the support mount slide housing 1603 mounts in an intimate fashion to support structure 1610. Locking and unlocking the support mount slide housing 1603 along support structure 1610 (generally along the distal support axis 170) is achieved using a slide lock pull rod 1611 that pulls a slide lock lever 1607 against the opposing surface of support structure 1610. The slide lock lever 1607 rotates about slide housing 1609, and is biased by slide lock pull rod bias spring 1613 which is mounted around slide lock pull rod 1611 which pushes slide lock lever away from the opposing surface of support structure 1610 when actuated. The slide lock pull rod bias spring 1613 is necessarily weaker than Bellville washer 1621 allowing locking of support mount slide housing 1603 when not actuated. Belleville washers 1621 create locking tension on slide lock pull rod 1611 when not actuated. Pushing the slide release lever 1665 engages slide releases screw 1660 against slide lock pull rod 1611, compressing Belleville washers 1621 in turn release locking force on support structure 1610. The release screw 1660 and the slide lock pull rod 1611 are attached using tension adjustment nut 1627 with washer 1631. Threaded hinged dowel with set screw 1670 fits through mating holes in housing 1623 and holes in slide release lever 1665 allowing slide release lever to pivot. FIG. 16C shows the exploded view presented in FIG. 16B at a different angle.

Figure 17A:
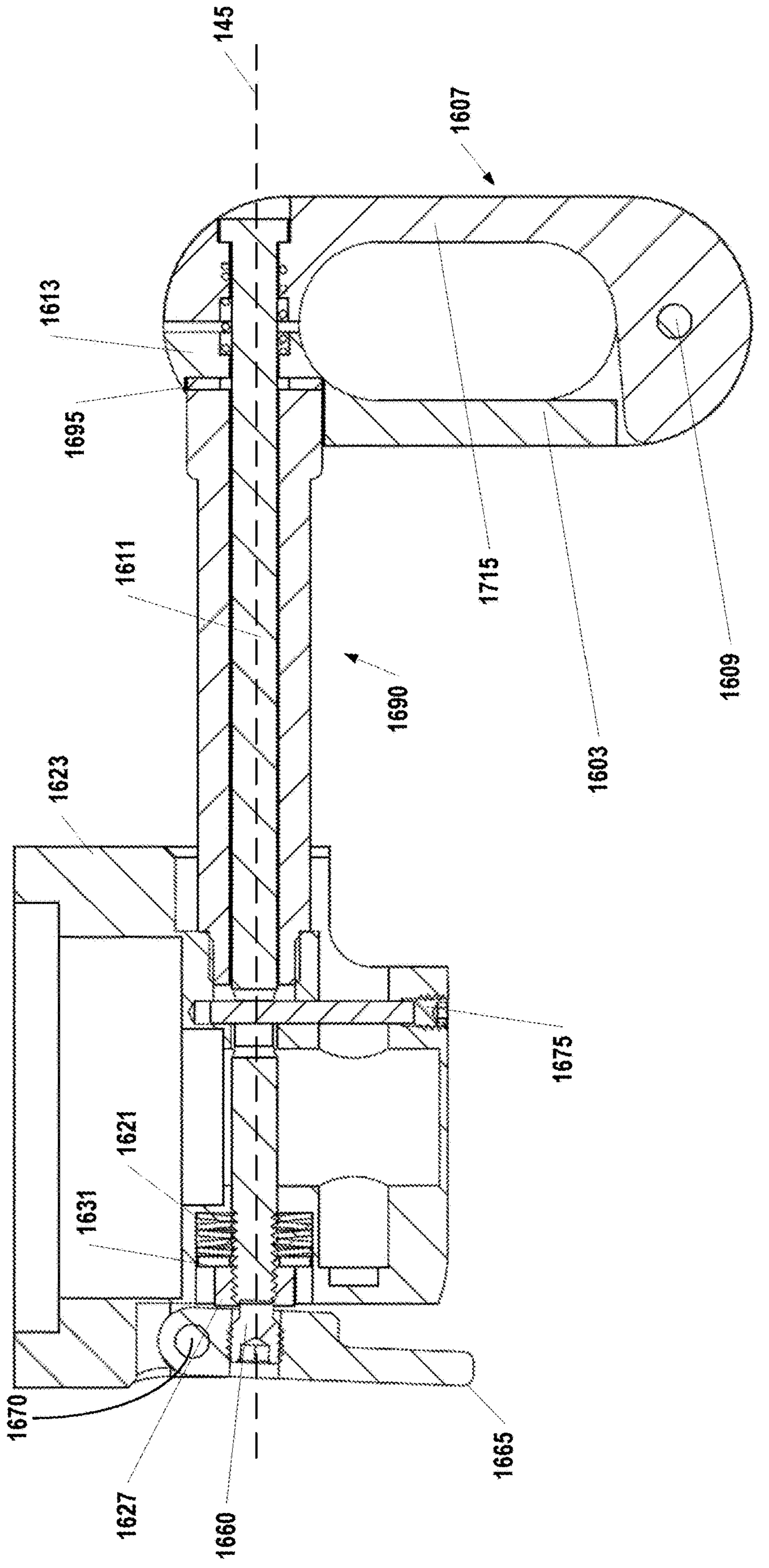
FIG. 17A illustrates a slide lock mechanism used in some embodiments of the present invention.

FIG. 17A illustrates the components of the embodiments of the slide lock mechanism used to lock and unlock the motion of the boot mount apparatus 1605 along the support structure 1610 and generally parallel with the distal support axis 170 described above and illustrated in FIG. 16A-C. Locking and unlocking the support mount slide housing 1603 along support structure 1610 (generally along the distal support axis 170) is achieved using a slide lock pull rod 1611 that pulls a slide lock lever 1607 which mates inside surface 1715 against the opposing surface of support structure 1610. Belleville washers 1621 create locking tension on slide lock pull rod 1611 when not actuated. Pushing the slide release lever 1665 engages slide releases screw 1660 against slide lock pull rod 1611, compressing Belleville washers 1621, which in turn release locking force on support structure 1610. Housing 1623 can rotate about the boot float axis 145 due to the friction contact of offset post 1690 and the support mount slide housing 1603 in combination with thrust washer 1695.

Figure 17B:
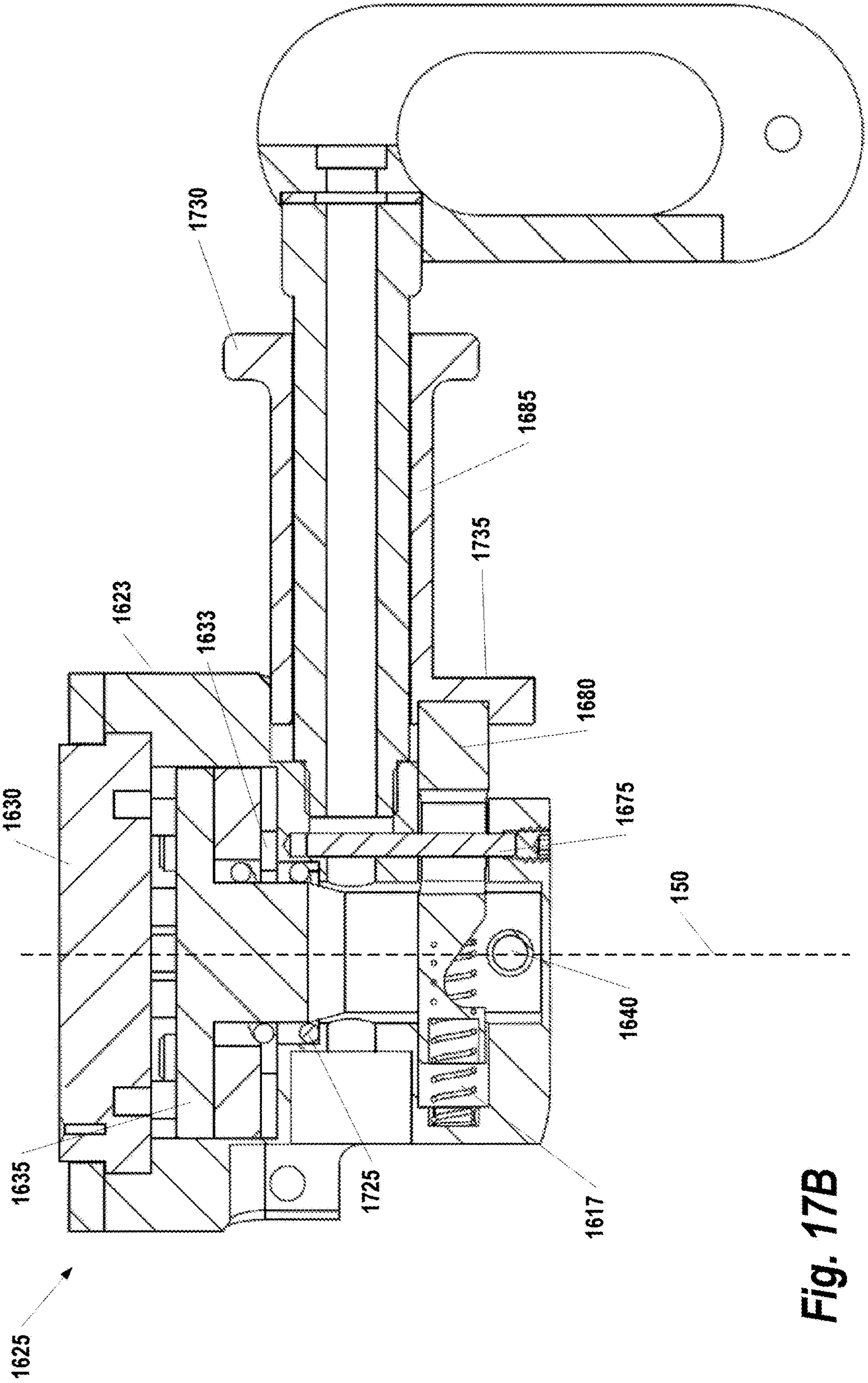
FIG. 17B illustrates the rotation control operation, as it may be implemented in some embodiments.

FIG. 17B illustrates the rotation control operation, as it may be implemented in some embodiments. Under idle state, when not actuated, the rotation lock bias spring 1725 pushes the pin ring 1635 assembly upwards such that the pins will engage with the holes in the boot mount ring 1630. The pin ring 1635 is fixed from rotation due to the four rotation lock dowels 1633, stationary in the housing 1623 and allowing only axial motion along medial/lateral axis 150 of the pin/spring ring assembly. The boot mount ring 1630 is attached to the boot (not shown) and restricted from axial motion along medial/lateral axis 150 by the housing 1623 below and retaining ring 1625 above. Moving the rotation release button activator 1685 is done by pulling the "pull surface" 1735 in a squeeze action from under the housing 1623 or by pushing the "push surface" 1730 from a position adjacent to the support structure. The rotation release button activator 1685 pushes the rotation release button 1680, compressing the rotation release button spring 1617 and moving the pin release surface along the rotation release roller 1640. The roller 1640, in turn, pulls the pin/spring ring downward and disengages the pins from the boot mount ring 1630. The boot mount ring 1630 is then free to rotate. When the rotation release button activator 1685 is released, the rotation release button spring 1617 and the downward force of the rotation lock bias spring 1725 moves the rotation release button 1680 to the original position.

Figure 17C:
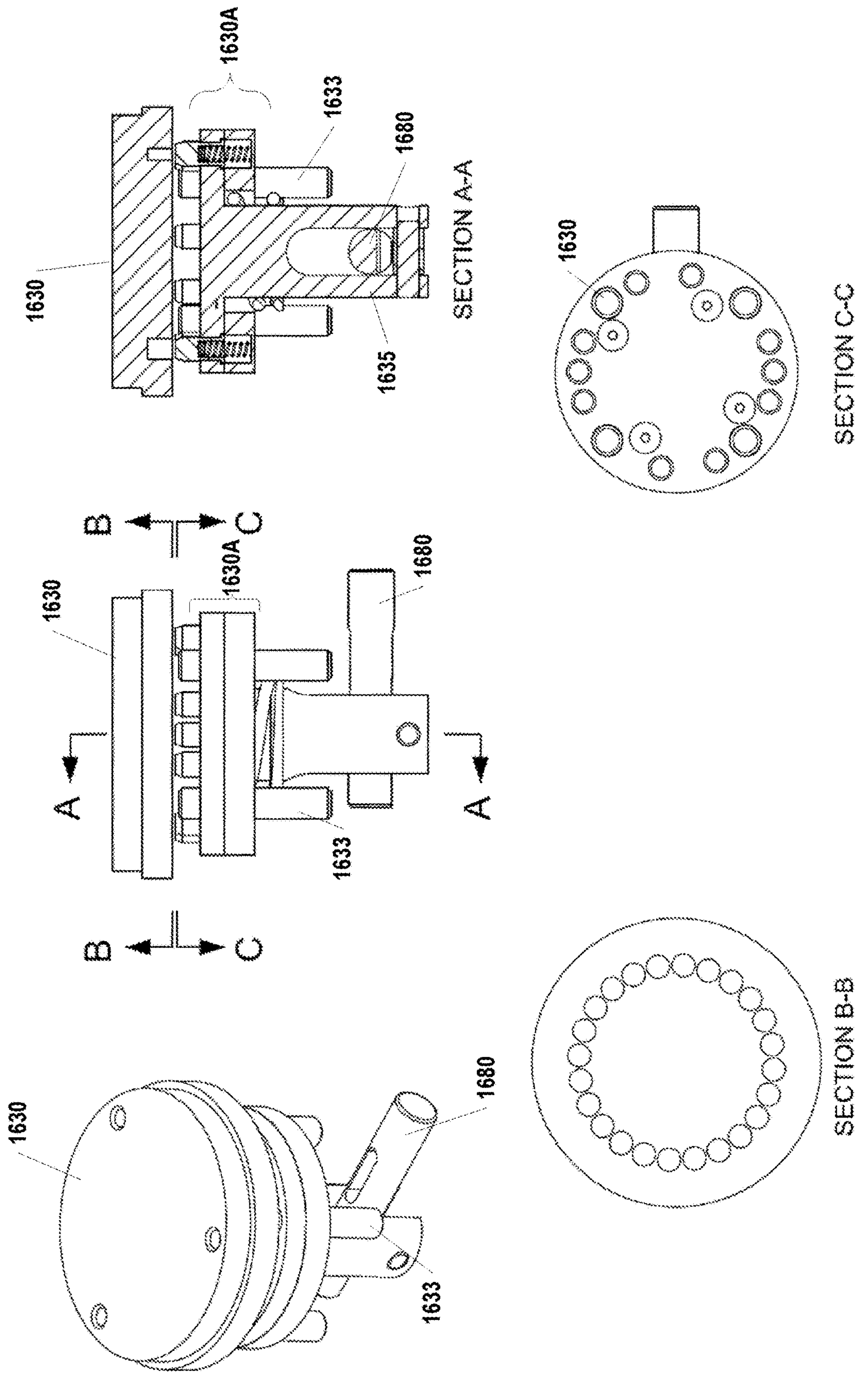
FIG. 17C illustrates the pin interface operation, according to some embodiments.

FIG. 17C illustrates the pin interface operation, according to some embodiments. The pin/spring ring assembly 1630A in this example holds 10 sets of pins and springs. There are 24 holes in the boot mount ring 1630 sized to allow a close fit to the pins, spaced equally about t360 degrees of rotation. There are 10 pins in 5 pairs, each pin in a pair at 180 degrees in opposition to the other. Each of the 5 pairs are spaced such that only one pair will align with two of the 24 holes simultaneously in the boot mount ring 1630. Two pin engagement is sufficiently strong for the design purpose. The five pairs of pins in this example are offset at 0, +3, +6, +9 and +12 degrees from the 15 degree spacing of the 24 holes. Since 24 holes in the boot mount ring 1630 allow 15 degree rotational increments, 5 sets of pins spaced as they are allow for two pins to engage with two holes every 3 degrees, or at 120 discrete angular positions. The pins are each spring loaded. As the rotation release button 1680 is released, the pin bias spring 1655 pushes the pins toward the hole with enough force to overcome the 8 pin springs that cannot engage and therefore compress, allowing the 8 unengaged pins to retract into their respective pockets.

Figure 17D:
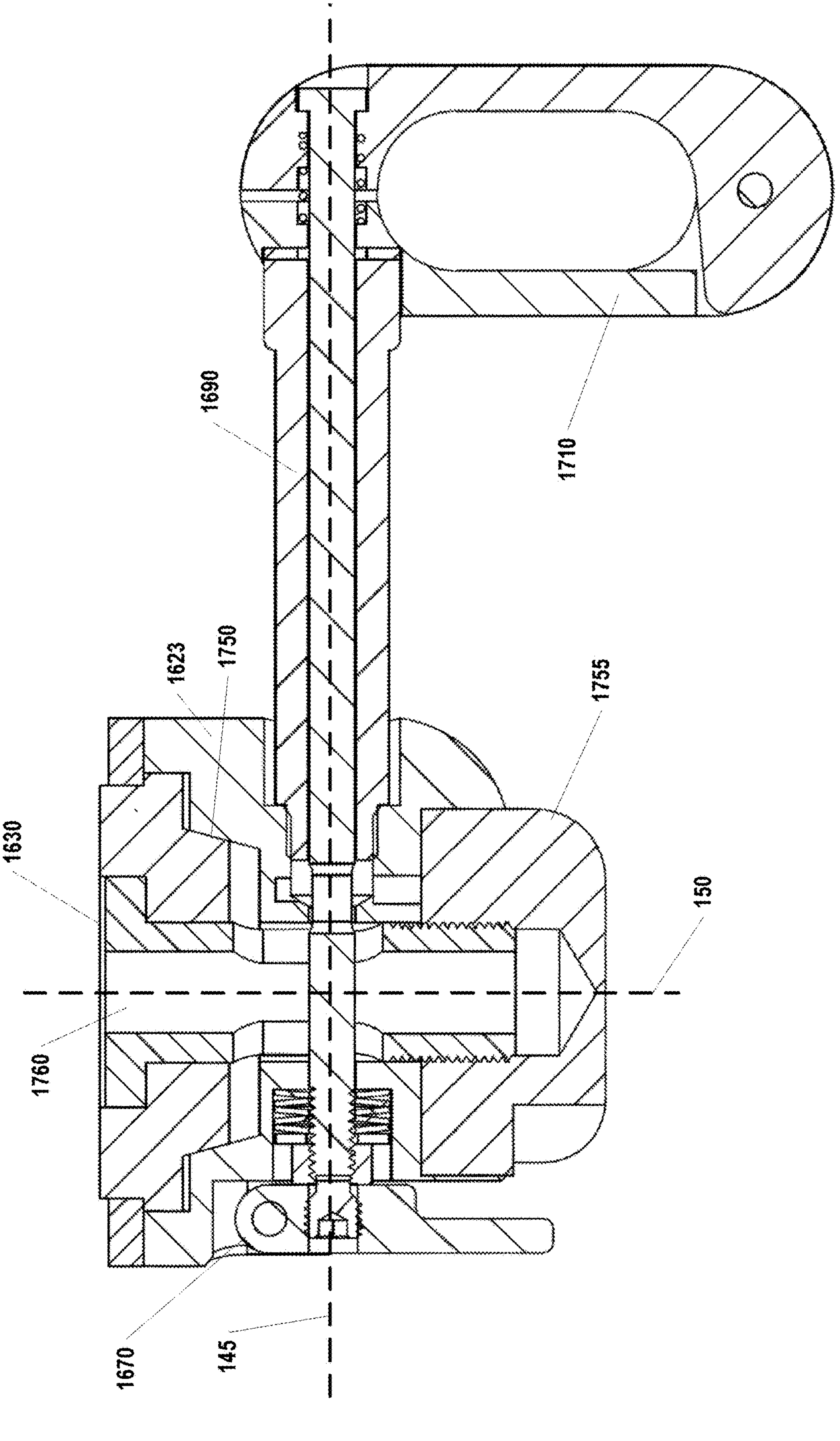
FIG. 17D illustrates operation of a friction control mechanism, according to some embodiments.

FIG. 17D illustrates operation of a friction control mechanism, according to some embodiments. The mechanism for locking and unlocking along the support structure axis, generally parallel to the distal support axis 170 (FIG. 1B) is the same as the embodiment illustrated in the FIG. 16 A-C and described above. Housing 1623 and its associated mechanism can rotate about the boot float axis 145. The housing 1623 is not lockable about the boot float axis 145 and it is held in place with friction force generated between the offset post 1690 and the support mount slide housing 1710. The boot mount ring 1630 is allowed to rotate about the medial/lateral axis 150 under frictional resistance. This friction is generated between the cone interface 1750 of the boot mount ring 1630 and the housing 1623. As the friction adjustment knob 1755 is turned clockwise, the friction post 1760 is pulled downward, increasing the friction force at the cone interface 1750. As the friction adjustment knob 1755 is turned counterclockwise, the friction at the cone interface 1750 is decreased. Users may adjust friction as needed or find a frictional force that is generally acceptable and not adjust from that position again. Since the support boot (and patient's) lower leg is mounted to the boot mount ring 1630, adjustments about the medial/lateral axis 150 can be made independent of the position of the slide release lever 1665.

The systems and apparatus shown in the figures are not exclusive. Other systems and apparatuses may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. No claim element herein is to be construed under the provisions of 35 U.S.C. 112, sixth paragraph, unless the element is expressly recited using the phrase "means for."

We claim:

1. An apparatus for supporting and positioning a patient's leg during a surgical procedure, the apparatus comprising:

a substantially rigid non-linear support structure;

a proximal locking swivel joint coupled to a proximal end of the support structure, wherein the proximal locking swivel joint holds the support structure in at least one position relative to a surgical table;

a gas piston assembly connected to the gas piston mounting element rigid non-linear support structure at a first piston end point and connected to the proximal end of the support structure at a second piston end point, wherein at least one of the first piston end point and the second piston end point is movable during operation as a spring in the gas piston assembly is being compressed and extended through the range of motion of the support structure to which it is attached; and an actuation handle coupled to the proximal end of the support structure and connected to the proximal locking swivel joint, wherein rotation of the actuation handle acting about an axis generally aligned with a distal end of the support structure results in release of the proximal locking swivel joint thereby allowing repositioning of the support structure relative to the surgical table, wherein said non-linear support structure provides a single non-linear actuation path extending between said actuation handle and said proximal locking swivel joint such that said actuation handle is capable of actuating said locking swivel joint via said single non-linear actuation path to rotate said non-linear support structure about a lithotomy axis and an abduction/adduction axis.

2. The apparatus of claim 1, further comprising:

a flexible support boot connected to the support structure via a moveable boot mount that allows movement of the flexible support boot in one or more dimensions relative to the support structure.

3. The apparatus of claim 2, wherein the flexible support boot comprises:

a substantially rigid ambidextrous foot section; and a flexible upper element comprising a left calf section or a right calf section coupled to the foot section.

4. The apparatus of claim 1, further comprising:

a bracket providing connection of the second piston end point to a distal end of the support structure, wherein the bracket allows translational movement of the second piston end point along an axis generally aligned with the proximal end of the support structure during operation of the gas piston assembly.

5. The apparatus of claim 1, wherein the non-linear support structure comprises an internal channel extending along the length of the support structure and the apparatus further comprises: a mechanism comprising a rotatable member that, when rotated, releases the proximal locking swivel joint, wherein the pulling of the actuation handle results in pulling of a cable around a pivot point thereby rotating the rotatable member and causing release of the proximal locking swivel joint.

6. The apparatus of claim 1, wherein the non-linear support structure comprises an internal channel extending along the length of the support structure, the proximal locking swivel joint comprises a rotatable member operable to release the proximal locking swivel joint, and the apparatus further comprises: an actuation rod coupled to the actuation handle and located in the internal channel; and a flexible torsion drive coupled to the actuation rod and the rotatable member, wherein the rotation of the actuation handle results in rotation of the rotatable member and release of the proximal locking swivel joint.

7. The apparatus of claim 1, wherein said proximal locking swivel joint is configured to allow rotation of said non-linear support structure about the lithotomy axis and the abduction/adduction axis.

8. An apparatus for supporting and positioning a patient's leg during a surgical procedure, the apparatus comprising:

a support device assembly comprising one or more non-linear support structures for supporting the patient's leg during the surgical procedure;

a gas piston connected to the support device assembly at a first piston end point and connected to a distal end of the support structure at a second piston end point, wherein at least one of the first piston end point and the second piston end point is moveable during operation of the gas piston; and an actuation handle coupled to the proximal end of the one or more non-linear support structures and connected to the proximal locking swivel joint, wherein rotation of the actuation handle acting about an axis generally aligned with a distal end of the support structure results in release of the proximal locking swivel joint thereby allowing repositioning of the support structure relative to the surgical table, wherein said one or more non-linear support structures provides a single non-linear actuation path extending between said actuation handle and said proximal locking swivel joint such that said actuation handle is capable of actuating said locking swivel joint via said single non-linear actuation path to rotate said one or more non-linear support structures about a lithotomy axis and an abduction/adduction axis.

9. The apparatus of claim 8, further comprising:

a bracket providing connection of the second piston end point to the distal end of the support device assembly, wherein the bracket allows translational movement of the second piston end point along an axis aligned with the distal end of the support structure when the gas piston is in a fully-extended position.

10. The apparatus of claim 8, wherein said proximal locking swivel joint is configured to allow rotation of said non-linear support structure about the lithotomy axis and the abduction/adduction axis.

* * * * *